US012623235B2

(12) United States Patent
Sorrell et al.

(10) Patent No.: US 12,623,235 B2
(45) Date of Patent: May 12, 2026

(54) HYDROCYCLONE SEPARATOR

(71) Applicant: Metso Sweden AB, Malmö (SE)

(72) Inventors: Joshua Sorrell, Mechanicsburg, PA (US); Evert Lessing, Espoo (FI)

(73) Assignee: Metso Sweden AB, Malmö (SE)

( * ) Notice: Subject to any disclaimer, the term of this patent is extended or adjusted under 35 U.S.C. 154(b) by 600 days.

(21) Appl. No.: 17/970,653

(22) Filed: Oct. 21, 2022

(65) Prior Publication Data

US 2024/0131531 A1 Apr. 25, 2024

US 2024/0226919 A9 Jul. 11, 2024

(51) Int. Cl.

*B04C 5/04* (2006.01)
*B04C 5/081* (2006.01)
*B04C 5/13* (2006.01)
*B04C 5/14* (2006.01)

(52) U.S. Cl.

CPC ................ *B04C 5/081* (2013.01); *B04C 5/04* (2013.01); *B04C 5/13* (2013.01); *B04C 5/14* (2013.01)

(58) Field of Classification Search

CPC .. B04C 5/04; B04C 5/081; B04C 5/13; B04C 5/14

See application file for complete search history.

(56) References Cited

U.S. PATENT DOCUMENTS

| | | | |
|---|---|---|---|
| 3,887,456 | A | 6/1975 | Loughner |
| 2015/0321122 | A1 | 11/2015 | Whetstone |

FOREIGN PATENT DOCUMENTS

| | | | |
|---|---|---|---|
| GB | 630821 A | 10/1949 | |
| GB | 2596147 A | 12/2021 | |
| JP | 3345606 B2 | 11/2002 | |

OTHER PUBLICATIONS

International Search Report and Written Opinion for International Application No. PCT/US2023/076040, mailed Jan. 15, 2024.

*Primary Examiner* — Dirk R Bass

(74) *Attorney, Agent, or Firm* — Andrus Intellectual Property Law, LLP

(57) ABSTRACT

The present disclosure relates to a hydrocyclone separator for size classifying solid material in liquid suspension, comprising a head part, a tapered separation part, and an apex discharge part for underflow discharge, the tapered separation part being arranged between the head part and the apex discharge part, wherein the apex discharge part has a first opening aligned and attached with the tapered separation part, and has a second opening for underflow discharge in a surface opposite to the first opening, the first opening being larger than the second opening, and an inner surface of the apex discharge part has a curvature extending from the first opening to the second opening, and wherein the apex discharge part at the second opening ends in a curvature in a tangential angle, β, within the range of 0°<β<40° from a reference plane defined transverse to a common symmetry axis of the tapered separation part and the apex discharge part.

12 Claims, 12 Drawing Sheets

HYDROCYCLONE SEPARATOR

FIELD OF THE INVENTION

The present disclosure relates to hydrocyclone separators for classifying solid material in liquid suspension in grain size. More closely the present disclosure relates to hydrocyclone separator comprising a head part having an inlet conduit configured to lead a suspension into the head part, and having an overflow discharge tube arranged axially, a tapered separation part, and an apex discharge part for underflow discharge. The tapered separation part is arranged between the head part and the apex discharge part.

BACKGROUND

Hydrocyclone separators are known to be cost effective, large capacity and efficient classification device for particle size separation of solids suspended in a liquid.

In general, a hydrocyclone is an enclosed vortical machine usually comprising a short cylindrical section followed by a conical section. Feed of a suspension of solids is supplied under predetermined pressure tangentially or in a volute path into the head part so as to create therein a swirling stream of fluid, which stream follows a path of gradually decreasing radius toward the point of the narrowest radius of the cone, commonly known as the apex or spigot.

As the spiral path approaches the apex of the hydrocyclone, a portion of it turns and begins to flow towards the opposite end, i.e. towards the cylindrical section. Also, this flow is in a spiral path of radius smaller than the radius of the first spiral while rotating in the same direction. Thus, a vortex is generated within the hydrocyclone. The pressure will be lower along the central axis of the vortex and increase radially outwardly. The idea is that the hydrocyclone will separate the particles of the slurry according to shape, size and specific gravity with faster settling particles moving towards the outer wall of the hydrocyclone eventually leaving the hydrocyclone through the apex discharge part. Slower settling particles will move towards the central axis and travel upwardly, eventually leaving the hydrocyclone through the overflow discharge tube. The discharge tube is normally extending down into the cylindrical section such that short-circuiting of the feed is prevented.

The efficiency of this operation, that is the sharpness of the separation of the course from the finer particles, depends on the size of the apex opening, the feed speed, and the density of the material to be separated and classified. Somewhat simplified, it can be stated that the apex geometry drives the pressure and the flow. It also determines the underflow density. The length of the conical section from the cylindrical part to the apex opening are also known to have an impact on the operation of the separation and/or classification.

However, the hydrocyclones of today have been shown to have higher efficiency with particle cut sizes ($d_{50}$) within the range of 5-100 μm, while the efficiency at coarser particle cut sizes is lower.

Prior art has suggested using wider cyclones and/or flat bottomed hydrocyclones for separation of particles cut sizes ($d_{50}$) in the region of 100-1000 μm. However, although cut size ($d_{50}$) increases, the separation efficiency decreases, coarse particles are reported to end up in the overflow and fines are reported to the underflow.

Prior art has earlier also suggested alterations to the inlet design in the head part, such as vortex finder design, but also cone angle design of the separation part to improve sharpness of separation.

Proceeding therefrom, it is an object of the present disclosure to provide a hydrocyclone separator for recovering of coarse particles with cut sizes ($d_{50}$) the range of 100-1000 μm with improved separation efficiency in comparison of what has been disclosed within prior art.

SUMMARY

According to a first aspect of the present disclosure, these and other objects are achieved, in full or at least in part, by a hydrocyclone separator for size classifying solid material in liquid suspension, comprising a head part having an inlet conduit configured to lead a suspension into the head part, and having an overflow discharge tube arranged axially in the head part; a tapered separation part; and an apex discharge part for underflow discharge. The tapered separation part is arranged between the head part and the apex discharge part with a wide opening end face aligned and arranged to the head part and a narrower opening end face aligned and arranged to the apex discharge part. According the present disclosure, the apex discharge part has a first opening aligned and attached with the narrower opening end face of the tapered separation part, and a second opening for underflow discharge in a surface opposite to the first opening, the first opening being larger than the second opening, and an inner surface of the apex discharge part has curvature extending from the first opening to the second opening. The tapered separation part and the apex discharge part has a common symmetry axis. Further, the apex discharge part at the second opening ends in a curvature in a tangential angle, β, within the range of $0° < \beta < 40°$ from a reference plane defined transverse to the common symmetry axis.

The term "hydrocyclone separator" should be construed broadly to encompass any hydrocyclone-based device capable of separating a solid suspension according to their size. Thus, the term "hydrocyclone separator" as used herein should also be construed as encompassing hydrocyclone classifiers.

The phrasings "a wide opening end face" and "a narrower opening end face" as used herein should be construed as the narrower opening end face is narrower than the wide opening end face. These opening end faces may also be expressed as "a wide opening end face" and "an, in comparison with the wide opening end face, narrower opening end face". In other words, the wide opening end face may have a wide opening end face diameter and the narrow opening end face may have a narrow opening end face diameter, wherein the wide opening end face diameter is larger than the narrow opening end face diameter.

The phrasing: "the curvature of the inner surface of the apex discharge part" as used herein should be construed as the curvature of the inner surface which is defined in the particular direction which interconnects the first and second openings. This particular direction is defined by the common symmetry axis. This may alternatively be expressed as the curvature of an intersection line between the inner surface of the apex discharge part and a radial reference plane which intersects with and is parallel to the common symmetry axis and extends radially outwardly therefrom. The radial reference plane is thus defined transversely to the aforementioned reference plane, which is orthogonal to the common symmetry axis. In other words, the curvature referred to herein may alternatively be expressed as the curvature of the intersection line defined between the inner surface of the apex discharge part and the radial reference plane.

The tapered separation part and the apex discharge part has a common symmetry axis. This implies that each of the tapered separation part and the apex discharge part are axisymmetric, or at least substantially axisymmetric. As such, an inner surface of one thereof may be defined by a single one-dimensional function which is rotated around the common symmetry axis. It also implies that a radial distance to such an inner surface will be constant for a specific position along the common symmetry axis. It is further noted that the head part cannot be defined as axisymmetric, since it includes portions which are helical. However, as readily appreciated by the person skilled in the art, the portion of the head part which faces the tapered separation part, may be axisymmetric, or at least substantially axisymmetric.

The inner surface of the apex discharge part from the first opening towards the second opening may also be disclosed as bowl shape or concave shape. The apex discharge part of the present disclosure provides a smooth transition from the tapered inner wall of the separation part over in a concave curvature having a decreasing tangential angle β, as seen from the reference plane, towards the second opening, and ending up with a curvature in a tangential angle β within the range of $0° < β < 40°$ from the reference plane. This implies that the inner wall is curvilinear. It further implies that the inner wall does not have any planar portions. The inner wall interconnects the first opening and the second opening.

By having an apex discharge part with an inner wall having a progressively decreasing tangential angle β from the reference plane and ending within the range of $0° < β < 40°$ from the reference plane at the second opening, separation of particles in the range of 100-1000 μm with improved separation efficiency was provided.

The reason behind the improved separation efficiency is believed to be a trade-off between different physical phenomena of the flow. At portions closer to the first opening, i.e. where the tangential angle β is relatively large, such as e.g. >80°, the axial and tangential velocities are generally high. The reason for the higher axial velocity is due to outer vortex flows downward motion being enhanced as there is a relatively unhindered flow path to the underflow and discharge. Smaller particles which enter the cyclone close to the wall under influence of the higher tangential and axial velocities tend to follow the coarse particles in the direction towards the apex. At portions closer to the second opening, i.e. where the tangential angle β is relatively small, such as e.g. <50°, the axial velocity will decrease since the progressively decreasing cross-sectional profile as seen transverse to the common symmetry axis effectively acts as a hinderance to the underflow and discharge. This lower axial velocity aids in increasing retention time allowing smaller particles to migrate under drag to the inner up flowing vortex core.

At the same time, tangential velocities in these portions closer to the second opening are not decreasing to the same extent. Similar to what has been found for flatbottom cyclones, the portions closer to the second opening will ensure that larger particles are subjected to the up flowing internal vortical core at the common symmetry axis. This effectively allows a second classification of these particles, while also present smaller and medium sized particles get sucked up to the overflow. However, contrary to conventional flat-bottom designs, a difference is that larger particles, which are also sucked up, is now subjected to the larger tangential velocities, relative to the flatbottom cyclones, which is maintained due to the rounded shape of the inner surface of the apex discharge part. This results in the larger particles once again being centrifuged towards the outside wall and translating in a higher probability that they finally will report to the underflow. In other words, the convex shape creates a very effective secondary elutriation classification zone at the bottom, which effectively will increase the sharpness of the classification. In other words, the rounded shape, which may be disclosed as a bowl shape or a concave shape, thus guides the axial flow to change direction, but gently more than abruptly, and thereby does not affect the tangential velocities and may as a result thereof aid in supporting the formation of vortices within the apex discharge part without disturbing the flow of the largest particles towards the underflow, thus avoiding deposit formation. The vortices, or eddies, support the formation of the aforementioned secondary elutriation classification zone at the bottom. Needless to say, some particles may be transported more than one extra turn through said secondary elutriation classification zone. Taken together, the likelihood that a particle having a size larger than but close to the cut size ($d_{50}$) will report to the underflow is even further increased. In short, it is the tangential flow that provides for the separation of particle sizes, while the axial flow provides for reporting to underflow or overflow.

The particle cut size ($d_{50}$) for the hydrocyclone separator of the present disclosure has been found to be significantly larger than for a conventional conical design. This may also be explained by the flow pattern described hereinabove. Similar to the conventional flat-bottom designs, the lower axial velocity may greatly aid in increasing retention time allowing larger particles to build up at the bottom, and thereby report to the underflow. When exposed to the axial upflow in the centre, a larger portion of coarser particles, than would be the case in a traditional conical cyclone, will therefore report to the overflow. This will cause the particle cut size ($d_{50}$), which has an equal probability to report to the over- or underflow, to become coarser than in a traditional conical hydrocyclone. According to an embodiment of the hydrocyclone separator according to the present disclosure, the apex discharge part at the second opening ends in a curvature in the tangential angle, β, within the range of $0° < β < 30°$ from the reference plane, $1° < β < 30°$ from the reference plane, $2° < β < 26°$ from the reference plane, $3° < β < 20°$ from the reference plane, or $4° < β < 20°$ from the reference plane. It is also conceivable that the apex discharge part at the second opening ends in a curvature in an angle, β, within the range of $3° < β < 6°$ from the reference plane, $8° < β < 12°$ from the reference plane, $18° < β < 22°$ from the reference plane, or $24° < β < 27°$ from the reference plane.

These ranges have been found to be particularly beneficial for balancing the fluid characteristics in the hydrocyclone in particular for improving the separation efficiency. In particular, if the apex discharge part at the second opening ends in a curvature in the tangential angle β being too large, the hindrance effect described above may be too low to effectively slow down the axial flow. This may consequently risk decreasing the separation efficiency and/or the cut size ($d_{50}$).

According to an embodiment of the hydrocyclone separator according to the present disclosure, the tapered separation part has a cone angle, α, in the range of $0° < α < 20$, $0° < α < 15°$, $0° < α < 12°$, $0° < α < 10°$, $2.5° < α < 10°$, $2.5° < α < 7.5°$, or $3.5° < α < 6.5°$ with respect to the common symmetry axis. It is also conceivable that the tapered separation part has a cone angle, α, of about 12°, about 8°, about 5° or about 3.3° with respect to the common symmetry axis.

With the term "tapered separation part" is herein meant that the separation part has, from a wide opening end face to a narrower opening end face, a tapered surface which may have a constant cone angle, α. Thus, the tapered separation part may have a frusto-conical form. In another embodiment, the tapered surface may have a varying tangential angle, along the tapered separation part, which also may be termed as curvilinear form. The varying tangential angle may for example in the part close to the wide opening end face be larger than in a part close to the narrower opening end face, like in a cyclone form. For such a tapered separation part having a curvilinear form, an effective cone angle α may be defined by the angle formed between the common symmetry axis and a reference line which is parallel with the radial reference plane and which intersects an inner diameter of the wide opening end face and a diameter of the narrow opening end face. It is understood that the cone angle α defined for the frusto-conical form, the varying tangential angle defined for the curvilinear form, and the effective cone angle α are each defined in the radial reference plane and in relation to the common symmetry axis.

According to an embodiment of the hydrocyclone separator according to the present disclosure, a distance (F−h) between the wide opening end face and the narrower opening end face of the tapered separation part, in relation with a distance (A−h1) between the first opening and the second opening of the apex discharge part, (F−h):(A−h1), is larger than 2.4, within the range of 2.4:1 to 4.5, or within the range of 3 to 4.

With "a distance between the wide opening end face and the narrower opening end face of the tapered separation part" is herein meant that the distance between the two opening end faces as defined along the common symmetry axis. Since the two openings define the respective ends of the tapered separation part, and since each of the two openings are transverse to the common symmetry axis, the parameter (F−h) may thus represent the height of the tapered separation part.

With "a distance between the first opening and the second opening of the apex discharge part" is herein meant that the distance between the two openings as defined along the common symmetry axis. Since the two openings define the respective ends of the apex discharge part, and since each of the two openings are transverse to the common symmetry axis, the parameter (A−h1) may thus represent the height of an inner chamber defined in the apex discharge part.

According to an embodiment of the hydrocyclone separator according to the present disclosure, a distance (F−h) between the wide opening end face and the narrower opening end face of the tapered separation part, in relation with a diameter (F−d1) of the wide opening end face of the tapered separation part, (F−h):(F−d1), is within the range of 1.5 to 5.

This range may be beneficial because if was found to result in the improved characteristics disclosed herein for the inventive concept. Turned around, if the tapered separation part is made too long, or too short, there is a risk that the flow pattern in the hydrocyclone will not be optimal when the flow enters the apex discharge part from the tapered separation part in order to achieve the improved characteristics.

According to one embodiment of the hydrocyclone separator according to the present disclosure, the inlet conduit of the head part is an inlet conduit configured to tangentially lead a suspension into the head part, optionally also comprising a vortex finder.

In another embodiment of the hydrocyclone separator according to the present disclosure, the inlet conduit of the head part is configured to axially lead a suspension into the head part, wherein the head part further comprises swirl vanes for initiating a vortex flow of the suspension within the hydrocyclone.

According to another embodiment of the hydrocyclone separator according to the present disclosure, a distance (A−h1) between the first opening and the second opening of the apex discharge part, in relation with a diameter (A−d1) of the first opening for the apex discharge part, (A−h1):(A−d1), is within the range of 0.5 to 1, or within the range of 0.7 to 0.9.

These ratios may be advantageous since they contribute to the balancing of forces within the hydrocyclone. If the ratio is less the 0.5, the transition defined by the inner surface of the apex discharge part may become too sharp. If the ratio is larger than 1, the apex discharge part will be unnecessarily large, and as the apex discharge part is worn more rapidly than the tapered separation part and the head part, it will be an unnecessarily large wear part which has to be exchanged upon wear.

According to another embodiment of the hydrocyclone separator according to the present disclosure, a diameter (A−d1) of the first opening of the apex discharge part in relation with a diameter (A−d2) of the second opening for the apex discharge part, (A−d1):(A−d2), is within the range of 2 to 5, or within the range of 2 to 4, or within the range of 2.5 to 3.5.

These ranges may be beneficial because if was found to result in the improved characteristics disclosed herein for the inventive concept. If the ratio is too small, the inner surface of the apex discharge part will become less of a hindrance to the flow, thus effectively resulting in less efficient separation. Similarly, if the ratio is too large, the second opening may be too small to provide adequate discharge capability. Also, there is a risk that the hindrance will be to large, effectively decreasing the separation efficiency towards the typical behaviour found in flat-bottom cyclones.

According to another embodiment of the hydrocyclone separator according to the present disclosure, the apex discharge part at the first opening starts in a curvature in a tangential angle, β, within the range of $70° < \beta < 90°$ with respect to the reference plane.

If the tangential angle β at the first opening is too large, it may effectively move the separation flow process too far towards the second opening, which may result in a more transient flow pattern, which in turn may risk a less efficient separation process. If the tangential angle β at the first opening is too small, the hindrance may instead be too strong at the region close to the first opening of the apex discharge part, thus effectively slowing down axial velocities too much and too early in the process, also with a risk of a less efficient separation process.

According to another embodiment of the hydrocyclone separator according to the present disclosure, the apex discharge part at the first opening starts in a curvature in a tangential angle, β, being equal to, or substantially equal to $90° - \alpha$, where α is a cone angle of the tapered separation part, as defined with respect to the common symmetry axis.

Keeping the tangential angle β at the first opening of the apex discharge part equal to, or substantially equal to $90° - \alpha$, achieves the effect that the surface defined in the intersection between the tapered separation part and the apex discharge part will not present any abrupt angular shifts. This may be beneficial as it prevents disturbances to the flow progressing along said surface towards the apex discharge part.

According to another embodiment of the hydrocyclone separator according to the present disclosure, the curvature of the inner surface of the apex discharge part is gradually increasing along the common symmetry axis from the first opening to the second opening.

The provision of an inner surface having a gradual increase in curvature may be beneficial since it provides a gradually increasing hindrance to the flow. This may prevent build-up of particles at, or close to, the second opening of the apex discharge part. Such build-up may be detrimental to the flow pattern and may risk decreasing the efficiency of the hydrocyclone.

According to another embodiment of the hydrocyclone separator according to the present disclosure, a ratio between an inside radius R(x) of the inner surface of the apex discharge part as defined from a common symmetry axis A of the apex discharge part and a distance $x_{max}$ starting at the first opening and extending towards the second opening, $R(x)/x_{max}$, is described by a non-linear function which falls within the following ranges for varying relative distance $x/x_{max}$ from the first opening to the second opening along the common symmetry axis:

| $x/x_{max}$ | $R(x)/x_{max}$ |
|---|---|
| 0.000000 | 0.625000 +/− 0.02 |
| 0.050000 | 0.620419 +/− 0.02 |
| 0.100000 | 0.615341 +/− 0.02 |
| 0.150000 | 0.609660 +/− 0.02 |
| 0.200000 | 0.603270 +/− 0.02 |
| 0.250000 | 0.596067 +/− 0.02 |
| 0.300000 | 0.587972 +/− 0.02 |
| 0.350000 | 0.579073 +/− 0.02 |
| 0.400000 | 0.569334 +/− 0.02 |
| 0.450000 | 0.558396 +/− 0.02 |
| 0.500000 | 0.546047 +/− 0.02 |
| 0.550000 | 0.532202 +/− 0.02 |
| 0.600000 | 0.516762 +/− 0.02 |
| 0.650000 | 0.499447 +/− 0.02 |
| 0.700000 | 0.479712 +/− 0.02 |
| 0.750000 | 0.456803 +/− 0.02 |
| 0.800000 | 0.429828 +/− 0.02 |
| 0.810000 | 0.423859 +/− 0.02 |
| 0.820000 | 0.417667 +/− 0.02 |
| 0.830000 | 0.411224 +/− 0.02 |
| 0.840000 | 0.404498 +/− 0.02 |
| 0.850000 | 0.397460 +/− 0.02 |
| 0.860000 | 0.390081 +/− 0.02 |
| 0.870000 | 0.382330 +/− 0.02 |
| 0.880000 | 0.374163 +/− 0.02 |
| 0.890000 | 0.365522 +/− 0.02 |
| 0.900000 | 0.356343 +/− 0.02 |
| 0.910000 | 0.346533 +/− 0.02 |
| 0.920000 | 0.335982 +/− 0.02 |
| 0.930000 | 0.324567 +/− 0.02 |
| 0.940000 | 0.312151 +/− 0.02 |
| 0.950000 | 0.298507 +/− 0.02 |
| 0.960000 | 0.283146 +/− 0.02 |
| 0.970000 | 0.265319 +/− 0.02 |
| 0.980000 | 0.243758 +/− 0.02 |
| 0.990000 | 0.216214 +/− 0.02 |
| 1.000000 | 0.162500 +/− 0.02. |

The distance $x_{max}$ may fall within the range 30 to 1000 mm, or 200 to 500 mm, or 300 to 450 mm or 350 to 430 mm or may be about 400 mm.

It should be understood that the distance $x_{max}$ is the total range of the function R(x). Thus, the parameter $x_{max}$ may be equal to the distance (A−h1) between the first and second openings. However, for other embodiments of the apex discharge part, the inner surface may only extend along a portion of the function R(x). For such embodiments, $x_{max}$ will be larger than the distance (A−h1) between the first and second openings, and the inner surface will extend along a portion of the function R(x) which starts at x=0 and ends where x equals the distance (A−h1) between the first and second openings.

The provision of an apex discharge part having this particular curvature of its inner surface has been found to result in particularly beneficial separation characteristics. It is conceivable to provide an apex discharge part having this shape in many different dimensions.

Other objectives, features and advantages of the present disclosure will appear from the following detailed disclosure, from the attached claims, as well as from the drawings. It is noted that the present disclosure relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

BRIEF DESCRIPTION OF THE DRAWINGS

The present disclosure will be described in more detail with reference to the appended schematic drawings, which show an example of a presently preferred embodiment of the disclosure.

FIG. 6A will together with Table 3 describe a hydrocyclone separator used as a reference in experiments, termed herein "Ref1".

FIG. 6B will together with FIG. 6A and Table 3 describe another hydrocyclone separator used as a reference in experiments, termed herein "Ref2".

FIG. 6C will together with Table 3 and 4 describe different experimentally investigated hydrocyclone separators according to the disclosed inventive concept, herein termed "Case 1" to "Case 4".

DETAILED DESCRIPTION

Figure 1A:
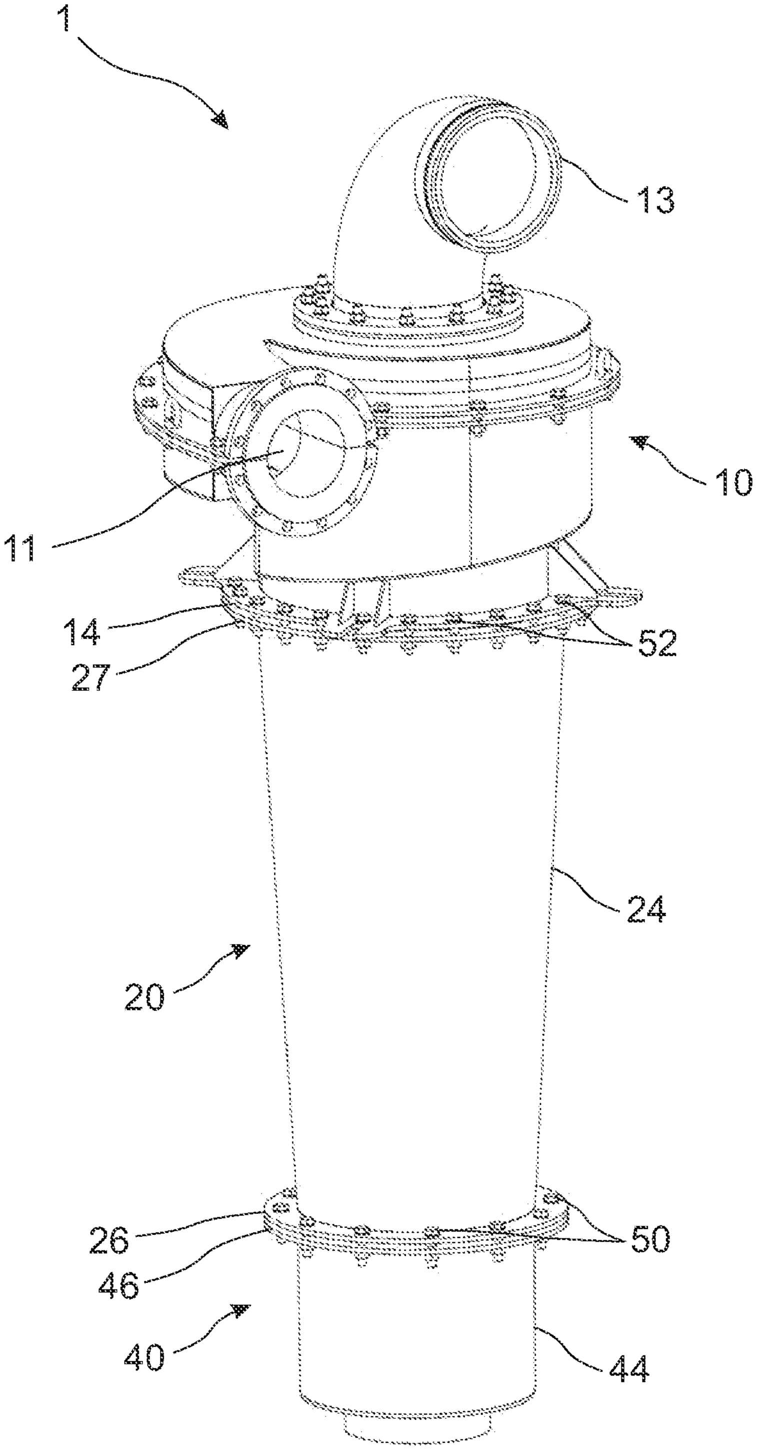
FIG. 1A is a perspective view of a hydrocyclone separator according to an embodiment of the present disclosure.

The present disclosure will now be described more fully hereinafter with reference to the accompanying drawings, in which currently preferred embodiments of the present disclosure are shown. The present disclosure may, however, be embodied in many different forms and should not be construed as limited to the embodiments set forth herein; rather, these embodiments are provided for thoroughness and completeness, and to fully convey the scope of the present disclosure to the skilled addressee. Like reference characters refer to like elements throughout.

Figure 1B:
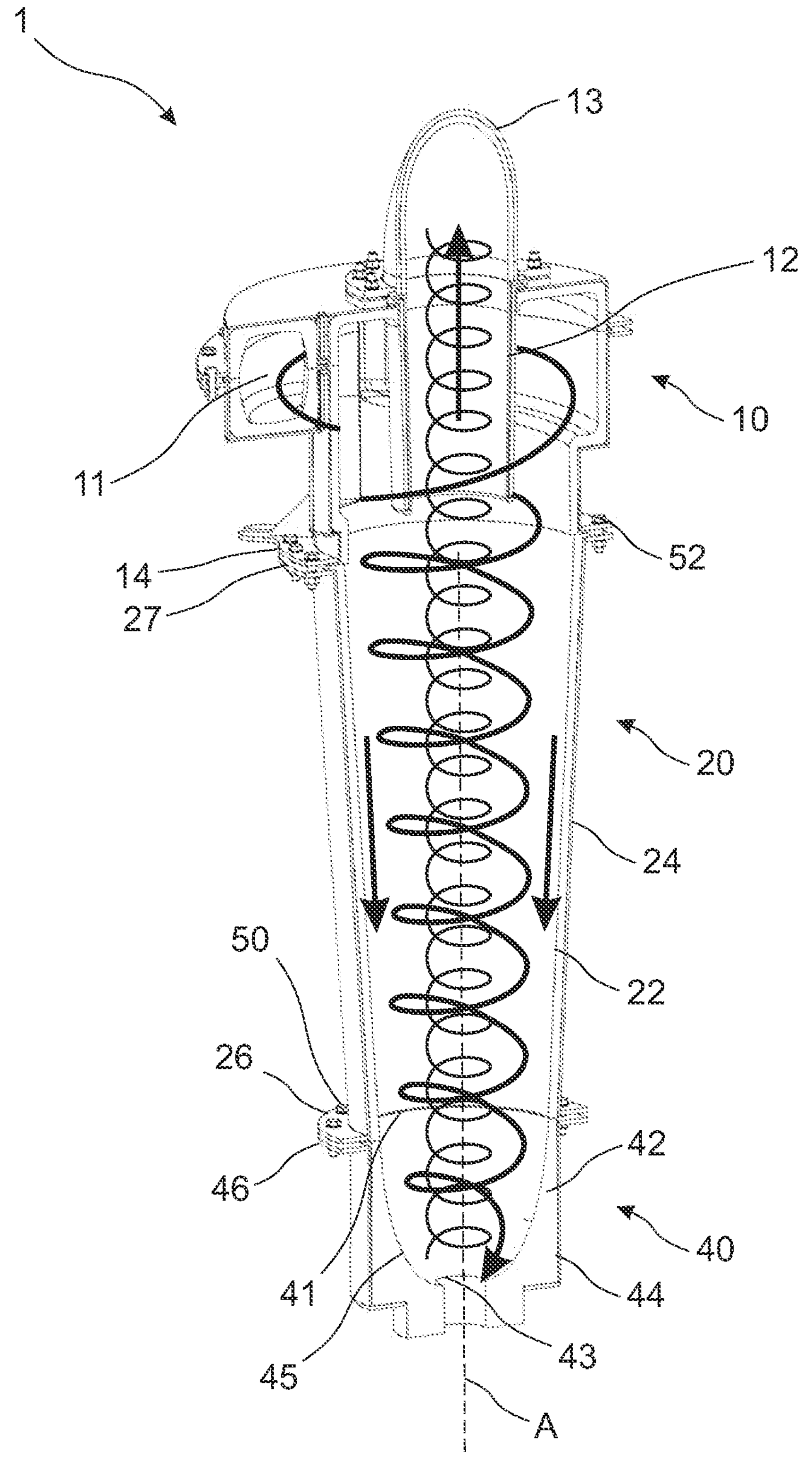
FIG. 1B is a perspective cut-through view of the hydrocyclone separator of FIG. 1A.
Figure 1C:
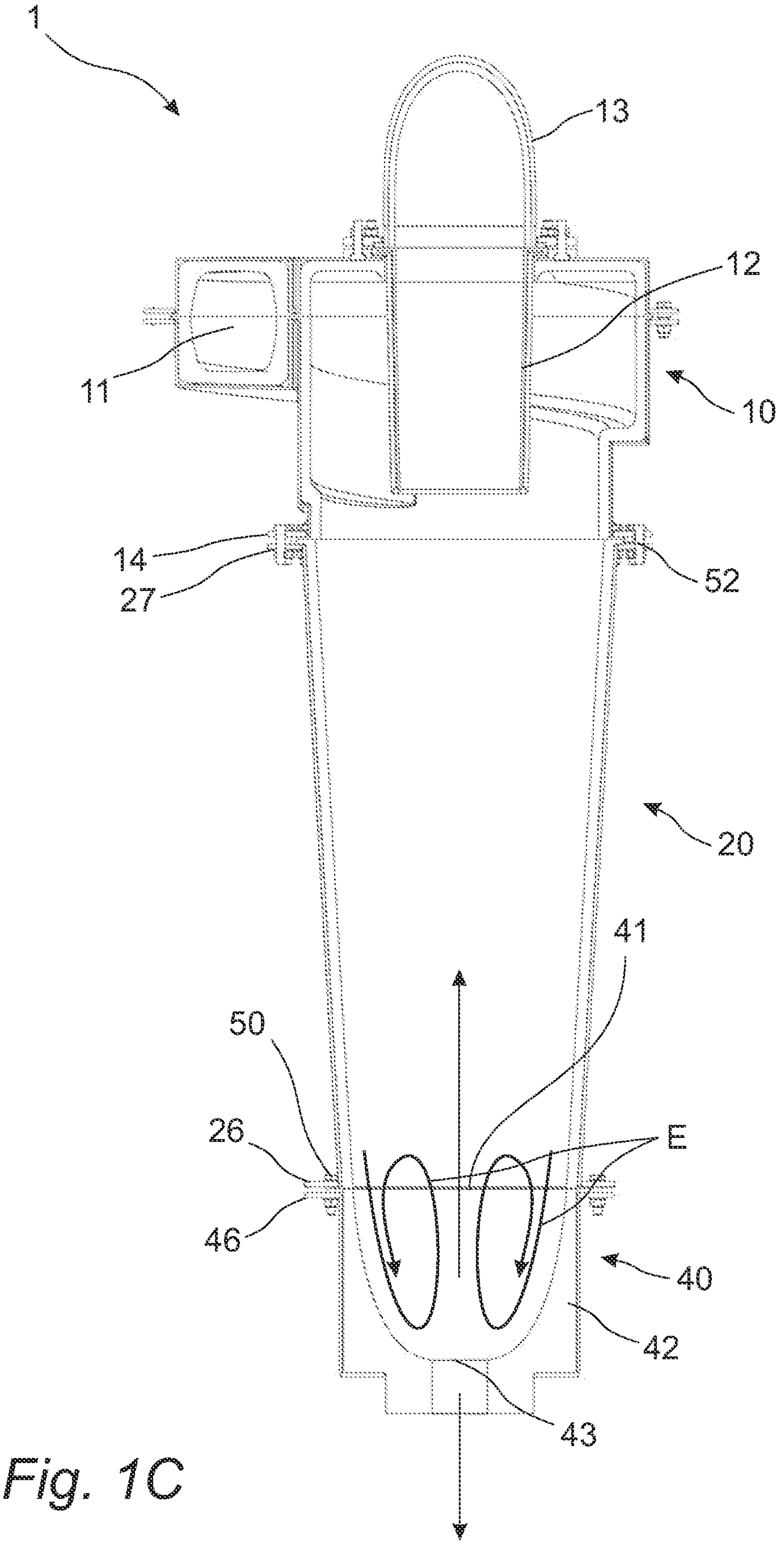
FIG. 1C is a cross-sectional view of the hydrocyclone separator of FIGS. 1A and B.
Figure 2:
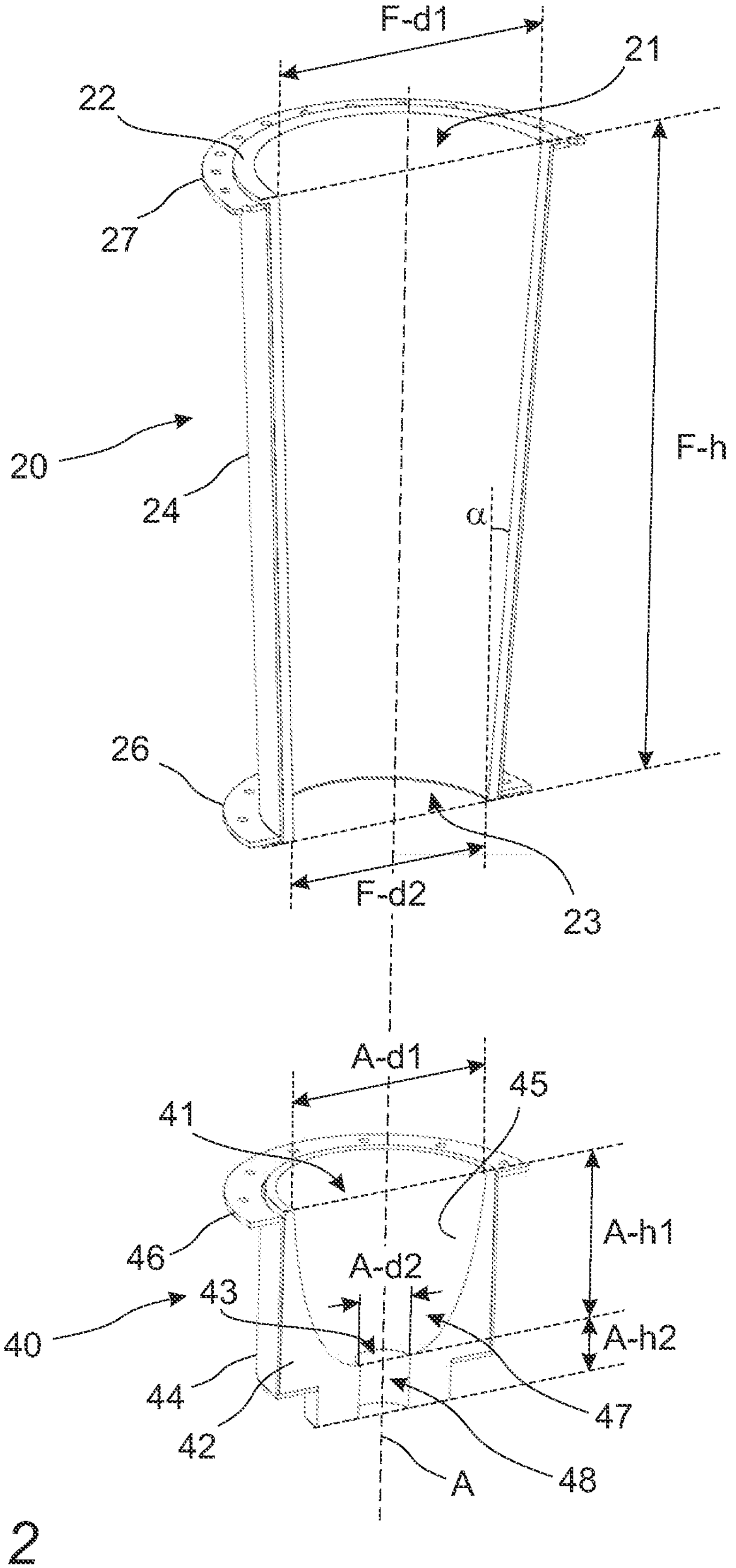
FIG. 2 is a perspective cut-through view of a tapered separation part and an apex discharge part of the hydrocyclone separator of FIG. 1A-C.

FIG. 1A-C shows a perspective view of a hydrocyclone separator 1 of one embodiment of the invention. FIG. 2 is an exploded view showing selected parts of the hydrocyclone separator and may therefore also be relevant to consult to fully appreciate what follows. The hydrocyclone separator 1 comprises a head part 10. An inlet conduit 11 is arranged to feed a suspension of solid material into the head part 10, and an overflow discharge tube 12 (see FIGS. 1B and C) is arranged axially through the head part 10. The head part 10 is connected with a tapered separation part 20, which in turn is connected with an apex discharge part 40 for underflow discharge. The main purpose of the head part 10 is to, by means of the helical geometry of the interior walls of the head part 10, create a downwardly progressing swirling motion for the suspension of solid material along the internal walls of the hydrocyclone separator 1. The head part of this kind may be embodied in many different ways as known in the art and is not further discussed herein.

The tapered separation part 20 is arranged between the head part 10 and the apex discharge part 40 with a wide opening end face 21 aligned and arranged to the head part 10 and a narrower opening end face 23 aligned and arranged to the apex discharge part 40 (see FIG. 2). The tapered separation part 20 comprises an abrasive-resistant body 22 and a separation part housing 24 enclosing the abrasive-resistant body 22. The separation part housing 24 has a circumferentially arranged flange 27 for attachment with a corresponding circumferentially arranged flange 14 of the head part 10. The attachment is in the example embodiment achieved by fastening bolts 52, but other fastening means is equally conceivable. The separation part housing 24 further has a circumferentially arranged flange 26 for attachment with a corresponding circumferentially arranged flange 46 of the apex discharge part 40. The attachment is in the example embodiment achieved by fastening bolts 50, but other fastening means is equally conceivable. The tapered separation part 20 and the apex discharge part 40 has a common symmetry axis A, see FIG. 1B. Thus, this implies that each of the tapered separation part 20 and the apex discharge part 40 are axisymmetric.

The apex discharge part 40 comprises an abrasive-resistant body 42 and an apex housing 44 enclosing the abrasive-resistant body 42. The apex discharge part 40 has a first opening 41 aligned and attached with the narrower opening end face 23 of the tapered separation part 20, and a second opening 43 for underflow discharge arranged in a surface opposite to the first opening 41. As can be seen in FIGS. 1B and C, the first opening 41 is larger than the second opening 43. Also evident from said figures is that an inner surface 45 of the apex discharge part 40 has a curvature extending from the first opening 41 to the second opening 43. The inner surface 45 of the apex discharge part 40 from the first opening 41 towards the second opening 43 may also be disclosed as bowl shape or concave shape. The inner surface 45, the first opening 41 and the second opening 43 together defines a first interior sub volume 47 of the apex discharge part 40 (See FIG. 2). The apex discharge part 20 further comprises a second interior sub volume 48 (See FIG. 2). The second interior sub volume 48 connects with the first interior sub volume 47 at the second opening 43 and extends away from the first sub volume 47 to define a discharge conduit for the apex discharge part 40 through which material is allowed to be discharged from the apex discharge part 40. The second interior sub volume 48 is for the example embodiment cylindrically shaped having a height A−h2 (See FIG. 2). However, the inventive concept is not related to the exact shape of the second interior sub volume 48 as such, and therefore many alternative geometries are conceivable.

Figure 3:
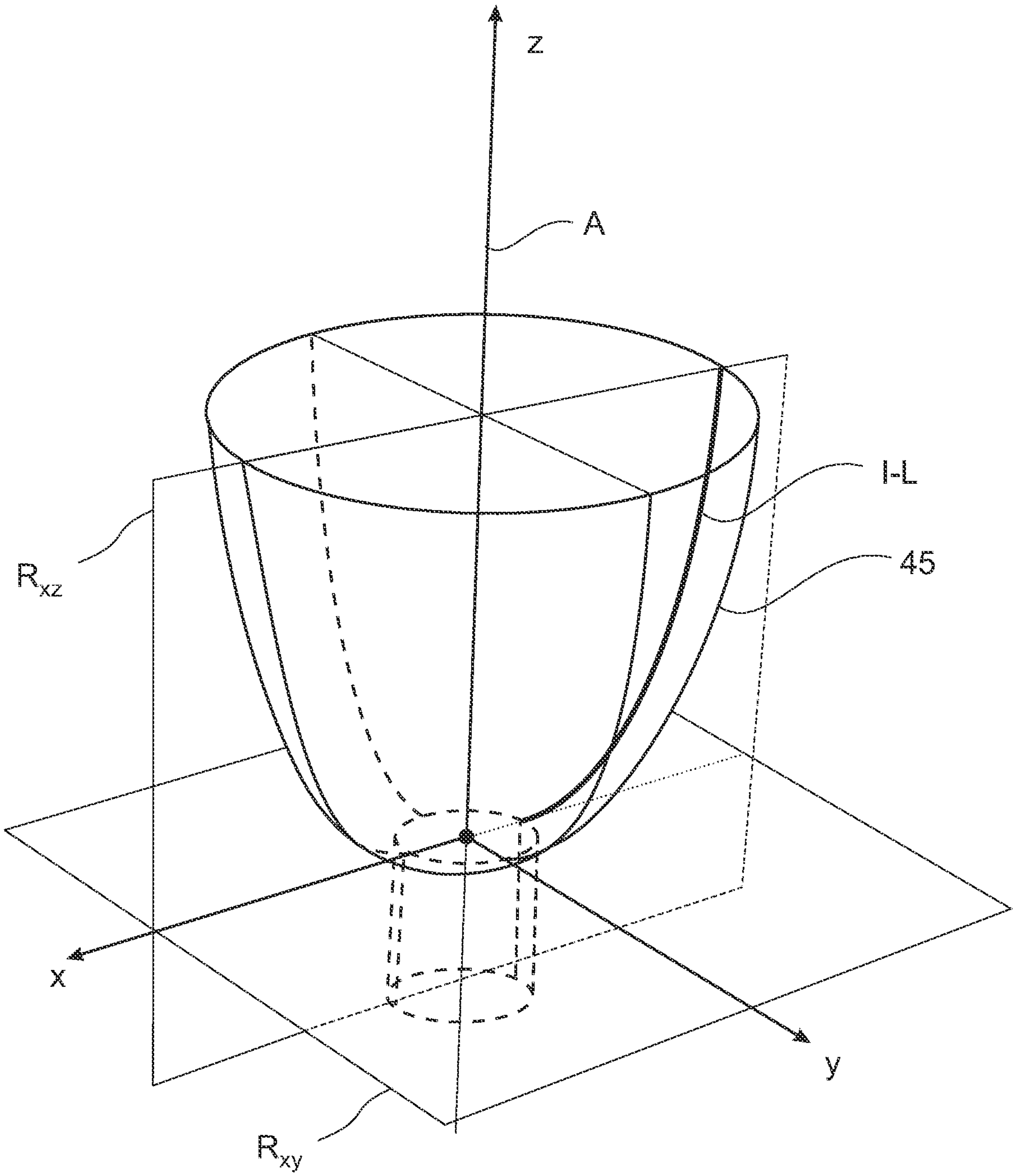
FIG. 3 is a schematic three-dimensional representation of an inner surface of the apex discharge part of the hydrocyclone of FIGS. 1 and 2.

The apex discharge part 20 at the second opening 43 ends in a curvature in a tangential angle, β, within the range of $0° < \beta < 40°$ from a reference plane $R_{xy}$ defined transverse to, or orthogonal to, the common symmetry axis A. The reference plane $R_{xy}$ is illustrated in FIG. 3 which is a three-dimensional schematic representation of the inner surface 45 of the apex discharge part 40 in a cartesian coordinate system. It is important to note that phrasing: "the curvature of the inner surface of the apex discharge part" as used herein should be construed as the curvature of the inner surface 45 which is defined in the particular direction which interconnects the first 41 and second 43 openings of the apex discharge part. This particular direction is defined by the common symmetry axis A. This may alternatively be expressed as the curvature of an intersection line I-L between the inner surface 45 of the apex discharge part 40 and a radial reference plane $R_{xz}$ which intersects with and is parallel to the common symmetry axis A and extends radially outwardly therefrom. The radial reference plane $R_{xz}$ is thus defined transversely to the aforementioned reference plane $R_{xy}$, which is orthogonal to the common symmetry axis A. In other words, the curvature referred to herein may alternatively be expressed as the curvature of the intersection I-L line defined between the inner surface 45 of the apex discharge part 40 and the radial reference plane $R_{xz}$.

Figure 4A:
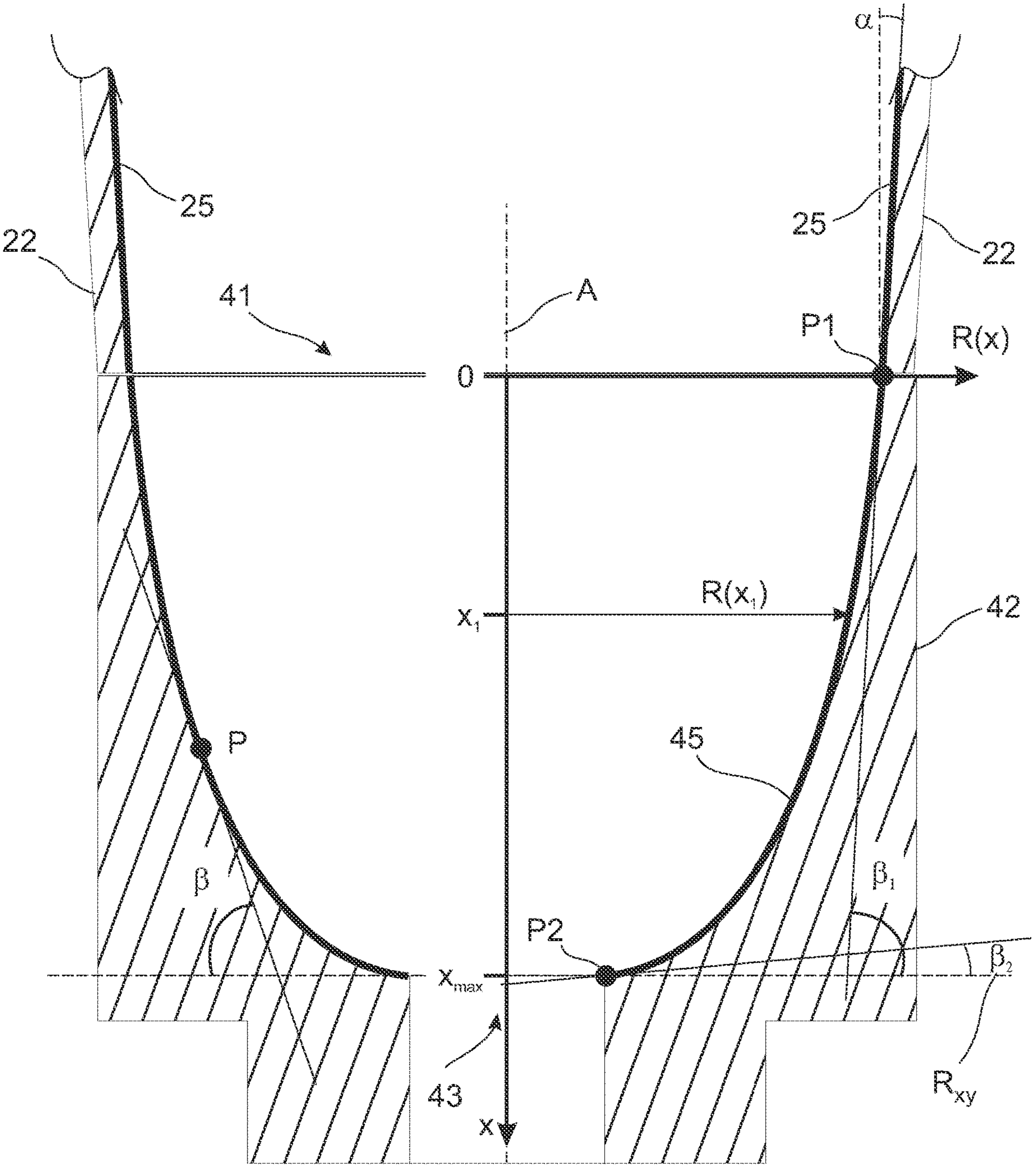
FIG. 4A is a cross-sectional side view of an abrasive-resistant body of the apex discharge part of the hydrocyclone separator of FIG. 1A-C and FIG. 2.

The curvature and its associated tangential angle β at the first 41 and second 43 respective openings are illustrated in FIG. 4A, which is a cross-sectional view along the radial reference plane $R_{xz}$ of the abrasive-resistant body 42 of the apex discharge part 40. For an arbitrary point P along the curvature of the inner surface 45, a tangential angle β may be defined in the radial reference plane $R_{xz}$ between the tangent at the arbitrary point P and the reference plane $R_{xy}$. As can be seen, the tangential angle β is within the range $0<\beta<90°$ for all points P along the inner surface 45. A first point P1 defines an end point of the curvature, the first point P1 being disposed at the first opening 41. A second point P2 defines another end point of the curvature, the second end point being disposed at the second opening 43. As can be seen in FIG. 4A, the tangential angle $\beta=\beta_1$ will at the first point P1 be relatively large. In the example embodiment, the angle $\beta_1$ is 86.7°. As one progresses from the first point P1 towards the second point P2 along the curvature of the inner surface 45, the angle β will progressively decrease. The rate of decrease is not constant. Rather, the rate of decrease is first relatively slow, whereas it gradually increases as one approaches the second point P2. This is because the curvature of the inner surface 45 of the apex discharge part 20 is gradually increasing along the common symmetry axis A from the first opening 41 to the second opening 43.

Figure 5A:
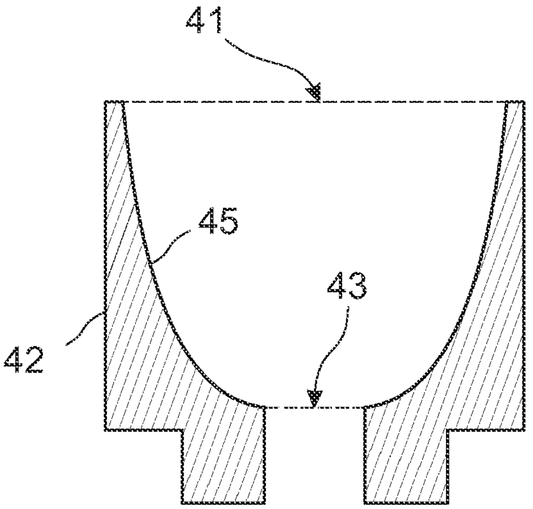
FIG. 5A is a cross-sectional side view of the abrasive-resistant body of the apex discharge part of FIG. 1A to 1C.

The hydrocyclone separator of the present disclosure should not be construed as limited to the example embodiment illustrated in FIGS. 1A-C and 2. In particular, many variations of the shape of the inner surface 45 and the relative dimensions of the apex discharge part 40 has been found to achieve the advantageous separation characteristics presented herein, and also later detailed in the experimental section. The variations in the shape of the inner surface 45 and relative dimensions of the apex discharge part 40 will now be described with reference to FIGS. 5B to 5I, which shows alternative example embodiments of the abrasive-resistant body 142, 242, 342, 442, 542, 642, 742, 842 of the present disclosure. FIG. 5A is included for completeness and illustrate already described abrasive-resistant body 42 according to the first example embodiment in the same cross-sectional view as FIGS. 5B to 5I. As readily appreciated by the person skilled in the art, each one of the alternative example embodiments of the abrasive-resistant body 142-842 will be equally well suitable to be arranged inside the previously described apex housing 44, or an alternative embodiment of the apex housing with suitable inner dimensions. To simplify the following description, reference to these alternative example embodiments or their respective features will be made by grouping reference numerals, where possible. Thus, the abrasive-resistant body 42, 142, 242, 342, 442, 542, 642, 742, 842 will be referred to as the abrasive-resistant body 42-842, the first opening 41, 141, 241, 341, 441, 541, 641, 741, 841 as the first opening 41-841, etc.

In FIGS. 5A-5I, which are all cross-sectional side views, the dashed lines mark the position of the first 41-841 and second 43-843 openings of each example embodiment, respectively, whereas the dotted lines in FIGS. 5B-5I illustrate the shape of the first example embodiment of FIG. 5A, i.e. the abrasive-resistant body 42, and is provided in FIGS. 5B-5I as a reference only. The alternative example embodiments of the abrasive-resistant body 42-842 will be described in what follows.

Figure 5B:
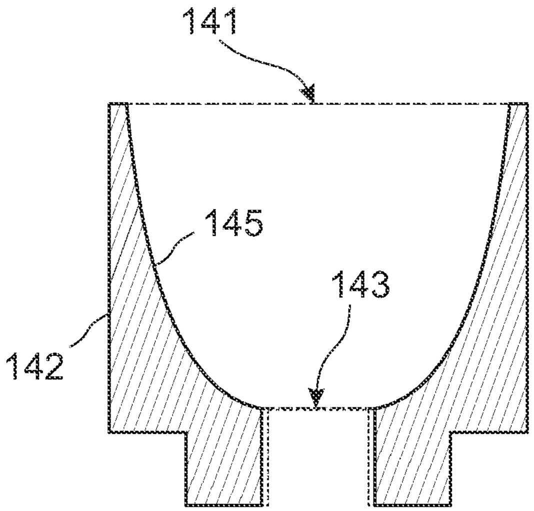
FIG. 5B is a cross-sectional side view of an abrasive-resistant body of an apex discharge part according to an alternative embodiment of the present disclosure.
Figure 5C:
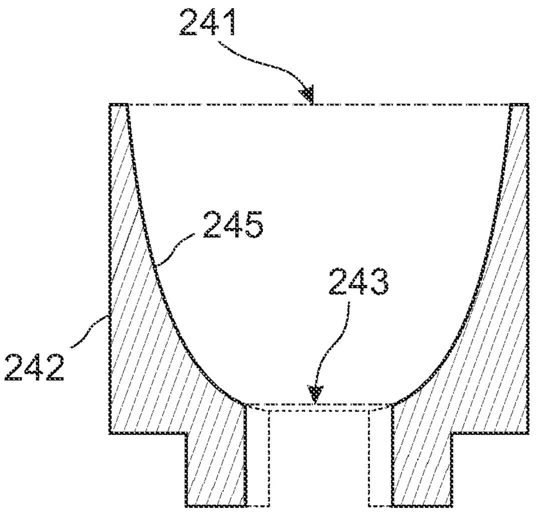
FIG. 5C is a cross-sectional side view of an abrasive-resistant body of an apex discharge part according to another alternative embodiment of the present disclosure.
Figure 5D:
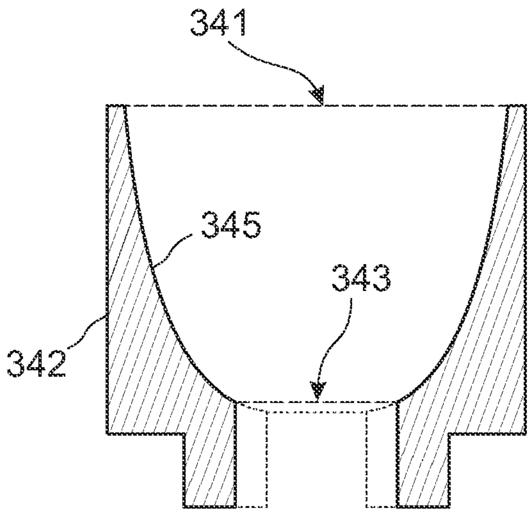
FIG. 5D is a cross-sectional side view of an abrasive-resistant body of an apex discharge part according to yet another alternative embodiment of the present disclosure.

FIGS. 5A to 5D have certain features in common and therefore serves a brief introductory description. As apparent from viewing the figures FIGS. 5A to 5D, the main difference between the illustrated example embodiments is the diameter of the second opening 43-343 through which the larger particles are discharged from the hydrocyclone separator 1. For the illustrated example embodiments, the diameter of the second opening 43 in FIG. 5A is 130 mm, the diameter of the second opening 143 in FIG. 5B is 150 mm, the diameter of the second opening 243 in FIG. 5C is 190 mm, and the diameter of the second opening 343 in FIG. 5D is 210 mm. Also apparent from viewing the figures FIGS. 5A to 5D is that the geometrical shape of the inner surface 45-345 can be described by the same curvature. For obvious reasons, the inner surfaces 45-345 differ from each other since the second opening 43-343 have different diameters, but the same function may be used to describe the curvature of each one of the inner surfaces 45-345 between the first P1 and second P2 points. This curvature will be described in detail later. Furthermore, experimental results will be described in a separate section herein, and these results are based on experiments performed on hydrocyclone separators having one of the example embodiments of FIGS. 5B and 5C.

Figure 5E:
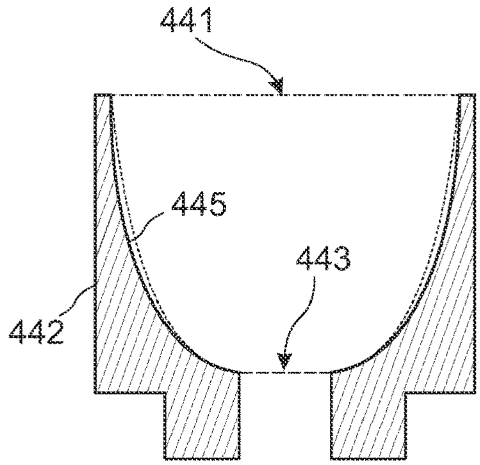
FIG. 5E is a cross-sectional side view of an abrasive-resistant body of an apex discharge part according to yet another alternative embodiment of the present disclosure.
Figure 5F:
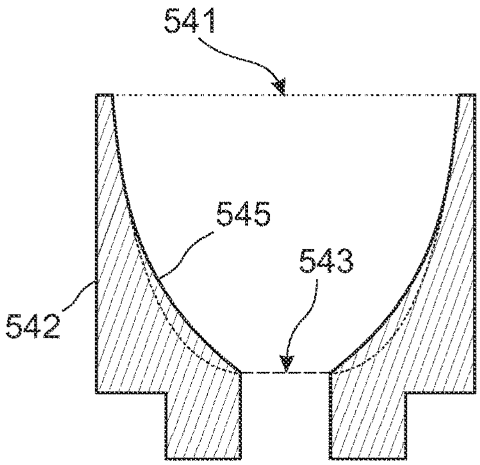
FIG. 5F is a cross-sectional side view of an abrasive-resistant body of an apex discharge part according to yet another alternative embodiment of the present disclosure.
Figure 5G:
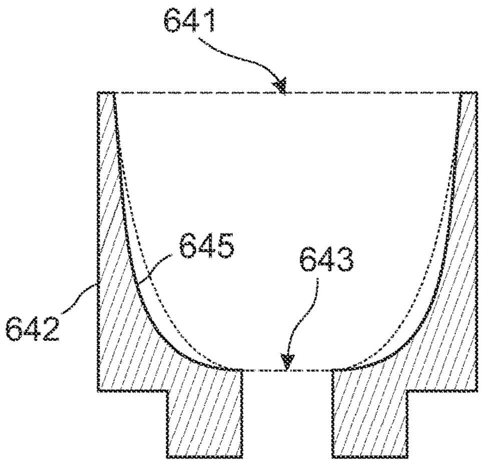
FIG. 5G is a cross-sectional side view of an abrasive-resistant body of an apex discharge part according to yet another alternative embodiment of the present disclosure.

As already mentioned, the tangential angle, β, will at the second opening 43-843 (i.e. at the second point P2) be within the range of $0°<\beta<40°$ (i.e. $0°<\beta_2<40°$ following the definitions in FIG. 4A). For the first example embodiment illustrated in FIGS. 1, 2 and 5A, the angle $\beta_2$ is 5°. For other embodiments of the present disclosure, the angle 12 may be within the range of $0°<\beta<30°$ from the reference plane $R_{xy}$, $1°<\beta<20°$ from the reference plane $R_{xy}$, $2°<\beta<10°$ from the reference plane $R_{xy}$, $3°<\beta<8°$ from the reference plane $R_{xy}$, or $4°<\beta<7°$ from the reference plane $R_{xy}$. As an example, the abrasive-resistant body 142 of FIG. 5B has the angle $\beta_2=9.4°$, the abrasive-resistant body 242 of FIG. 5C has the angle $\beta_2=20.1°$, the abrasive-resistant body 342 of FIG. 5D has the angle $\beta_2=25.5°$. The reason for the angle $\beta_2$ increasing with increasing diameter of the second opening 43-343 is that the inner surfaces 45-345 follows the same curvature. For an increasing diameter of the second opening 43-343, the second point P2 will shift to a new location along the curvature in the direction towards the first point P1, and at said new location, the curvature has another, steeper, tangential direction and thus a larger angle $\beta_2$. As another example, FIG. 5F illustrates an embodiment of an abrasive-resistant body 542 having an angle $\beta_2=40°$, and FIG. 5G illustrates an embodiment of an abrasive-resistant body 642 having an angle $\beta_2=0°$. These two example embodiments differ from the aforementioned example embodiments of FIGS. 5A-5D in that the curvature is not the same.

At the first opening 41-841 in the first point P1, the abrasive-resistant body 42-842 starts in a curvature in a tangential angle, β, being equal to, or substantially equal to $90°-\alpha$, where α is a cone angle of the tapered separation part 20, as defined with respect to the common symmetry axis A. This is also, for the first example embodiment, illustrated in FIG. 4A which, on top of the abrasive-resistant body 42 of the apex discharge part 40, also shows the lower portion of the abrasive-resistant body 22 of the tapered separation part 20. As illustrated in FIG. 4A, the inner surface 25 of the abrasive-resistant body 22 forms the angle α (referred to herein as the cone angle α) with the common symmetry axis A. Keeping the tangential angle β at the first opening of the apex discharge part (i.e. $\beta_1$ in FIG. 4A) equal to, or substantially equal to 90°−α, achieves the effect that the surface defined in the intersection between the tapered separation part 20 and the apex discharge part 40 will not present any abrupt angular shifts. This may be beneficial as it prevents disturbances to the flow progressing along said surface towards the apex discharge part 40. The cone angle, α, may be within the range of $0°<\alpha<20°$, $0°<\alpha<15°$, $0°<\alpha<12°$, $0<\alpha<10°$, $2.5°<\alpha<10°$, $2.5°<\alpha<7.5°$, or $3.5°<\alpha<6.5°$ with respect to the common symmetry axis A. For the example embodiment illustrated in FIGS. 1 and 2, the cone angle α is 3.3°. For other embodiments of the hydrocyclone separator, the abrasive-resistant body 142-842 at the first opening 141-841 (i.e. at the first end point P1) starts in a curvature 145-845 in a tangential angle, β, within the range of $70°<\beta<90°$ with respect to the reference plane $R_{xy}$. As an example, FIG. 5E illustrates an embodiment of an abrasive-resistant body 442 having an angle $\beta_1=90°$. If the tangential angle β at the first opening 41-841 is too large, it may effectively move the separation flow process too far towards the second opening 43-843, which may result in a more transient flow pattern, which in turn may risk a less efficient separation process. If the tangential angle β at the first opening 41-841 is too small, the hindrance may instead be too strong at the region close to the first opening 41-841, thus increasing the risk that axial velocities are slowing down too much and too early in the process, also with a risk of a less efficient separation process.

The relative dimensions of the hydrocyclone separator 1 according to the first example embodiment will now be described with reference to FIG. 2. As may be seen in FIG. 2, a distance F−h between the wide opening end face 21 and the narrower opening end face 23 of the tapered separation part 20, in relation with a distance A−h1 between the first opening 41 and the second opening 43 of the apex discharge part 40, i.e. the ratio (F−h):(A−h1), is about 3.8 for the example embodiment. For other not-illustrated example embodiments, this ratio may larger than 2.4, within the range 2.4 to 4.5, or within the range of 3 to 4. Specifically, embodiments having the ratio 2.43, 2.54, 3.68 and 3.79 have been tested and found to achieve the improved characteristics disclosed herein for the inventive concept.

Further, the distance F−h will in relation with a diameter F−d1 of the wide opening end face 21 of the tapered separation part 20, i.e. the ratio (F−h):(F−d1), be about 2.3 for the example embodiment. For other not-illustrated example embodiments, this ratio may be within the range of 1.5 to 5. This range was found to result in the improved characteristics disclosed herein for the inventive concept.

Figure 5H:
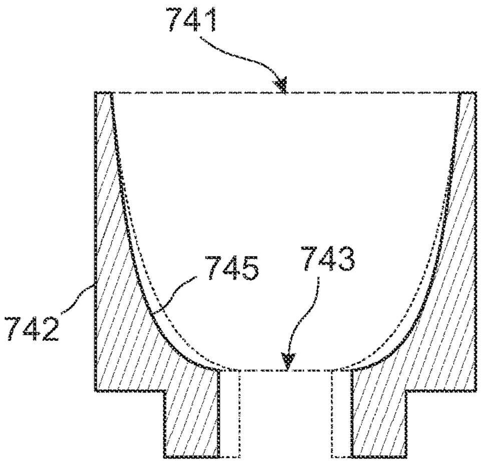
FIG. 5H is a cross-sectional side view of an abrasive-resistant body of an apex discharge part according to yet another alternative embodiment of the present disclosure.
Figure 5I:
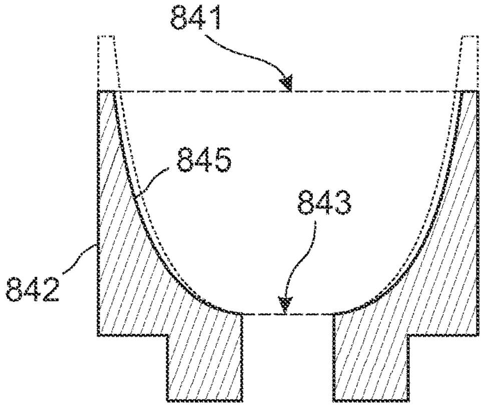
FIG. 5I is a cross-sectional side view of an abrasive-resistant body of an apex discharge part according to yet another alternative embodiment of the present disclosure.

Further, a distance A−h1 between the first opening 41 and the second opening 43 of the apex discharge part 40, in relation with a diameter A−d1 of the first opening 41, i.e. the ratio (A−h1):(A−d1), is for the example embodiment about 0.8. For other not-illustrated example embodiments, this ratio may be within the range of 0.5 to 1, or within the range of 0.7 to 0.9. As an example, FIG. 5I illustrates an example embodiment of an abrasive-resistant body 842 having a ratio (A−h1):(A−d1) being 0.64. These ratios may be advantageous since they contribute to the balancing of forces within the hydrocyclone 1. If the ratio is less the 0.5, the transition defined by the inner surface 45-845 of the abrasive-resistant body 42-842 may become too sharp. If the ratio is larger than 1, the abrasive-resistant body 42-842 will be unnecessarily large, and as the abrasive-resistant body 42-842 is worn more rapidly than the abrasive-resistant body 22 of the tapered separation part 20 and the head part 10, it will be an unnecessarily large wear part which has to be exchanged upon wear.

Referring again to the definitions of FIG. 2, a diameter A−d1 of the first opening 41 of the apex discharge part 40 in relation with a diameter A−d2 of the second opening 43 for the apex discharge part 40, (A−d1):(A−d2), is within the range of 2 to 5, or within the range of 2 to 4, or within the range of 2.5 to 3.5. For the example embodiment of FIGS. 1 and 2, this ratio is 3.84. As alternative examples thereof, the abrasive-resistant body 142 of FIG. 5B has a ratio (A−d1):(A−d2) being 3.33, the abrasive-resistant body 242 of FIG. 5C has a ratio (A−d1):(A−d2) being 2.63, and the abrasive-resistant body 342 of FIG. 5D has a ratio (A−d1):(A−d2) being 2.38. As yet another example, FIG. 5H illustrates an embodiment of an abrasive-resistant body 742 having a ratio (A−d1):(A−d2) being 2.6. The disclosed ranges were found to result in the improved characteristics disclosed herein for the inventive concept. If the ratio is too small, the inner surface 45-845 of the abrasive-resistant body 42-842 will become less of a hindrance to the flow, thus effectively resulting in less efficient separation. Similarly, if the ratio is too large, the second opening 43-843 may be too small to provide adequate discharge capability. Also, there is a risk that the hindrance will be too large, effectively decreasing the separation efficiency towards the typically behaviour found in flat-bottom cyclones.

Figure 4B:
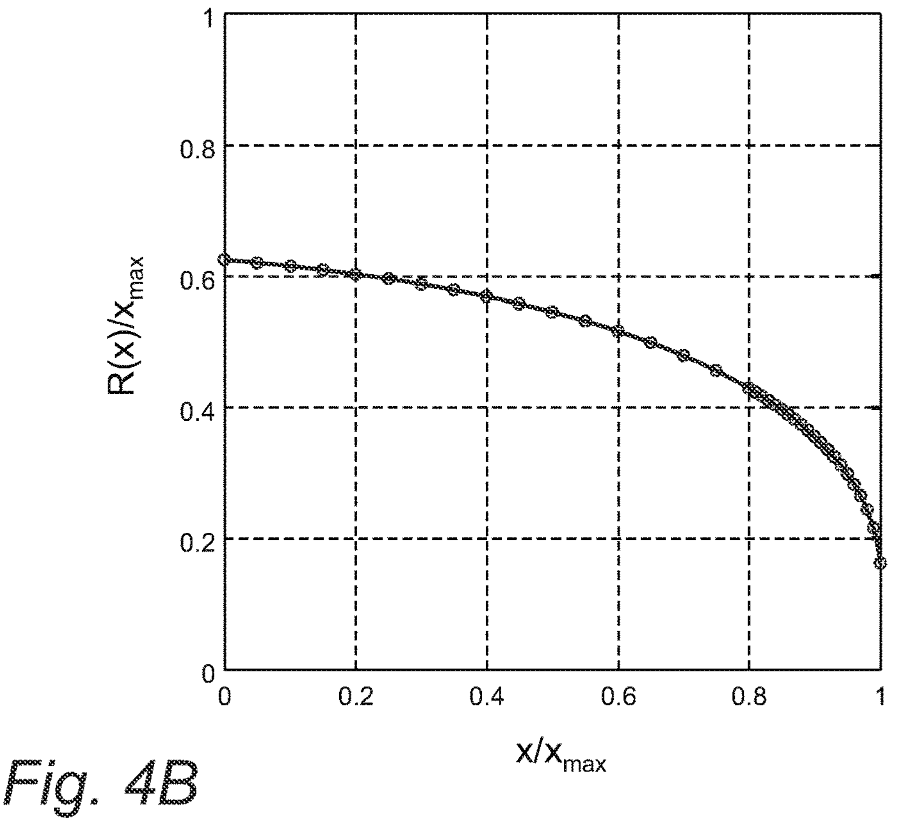
FIG. 4B is a plot of a non-linear function which describes the curvature of the inner wall of the abrasive-resistant body of FIG. 4A in a relative scale.
Figure 4C:
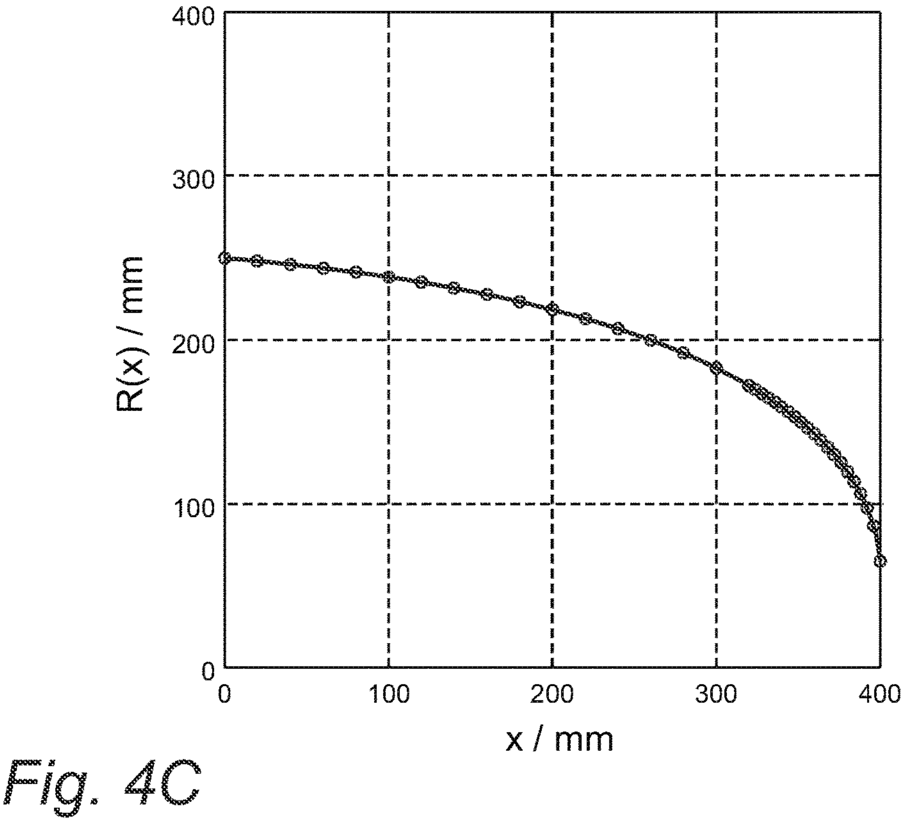
FIG. 4C is a plot of a non-linear function which describes the curvature of the inner wall of the abrasive-resistant body of FIG. 4A in an absolute scale.

The curvature of the inner surface 45-345 of the example embodiments in FIGS. 5A to D will now be described in more detail with reference to FIG. 4A to C. As previously mentioned, the example embodiments of FIGS. 5A to 5D have inner surfaces 45-345 which may each be described as following the same curvature. This curvature is illustrated in FIG. 4B in relative terms, and in FIG. 4C in absolute terms. Specifically, FIG. 4B illustrates the inside radius R(x) of the inner surface 45-345 of the apex discharge part 20 as defined the common symmetry axis A of the apex discharge part 20, normalized by a distance, $x_{max}$, which starts at the first opening 41-341 and extends towards the second opening 43-343 along the x-axis, which coincides with the common symmetry axis A. $x_{max}$ will thus act as a scaling factor for describing the particular curvature for apex discharge parts of different sizes. It should be understood that the distance $x_{max}$ is the total range of the function R(x). Thus, the parameter $x_{max}$ may be equal to the distance A−h1 between the first and second openings of the abrasive-resistant body 42-342. This is the case for the first example embodiment disclosed herein, i.e. the abrasive-resistant body 42 of FIG. 5A, where $x_{max}$=A−h1=400 mm. However, for other embodiments of the apex discharge part, such as the abrasive-resistant bodies 142, 242 and 342, the inner surface 145-345 only extends along a portion of the function R(x). For such embodiments, $x_{max}$ will be larger than the distance A−h1 between the first 141-341 and second 143-343 openings. Specifically, for each of the example embodiments of FIGS. 5A-D, $x_{max}$=400 mm. However, A−h1 will be 399 mm for the abrasive-resistant body 142, 393 mm for the abrasive-resistant body 242 and 389 mm for the abrasive-resistant body 342. Thus, the inner surface

145-345 start at x=0 and follows the function R(x) but not all the way to $x_{max}$, only to A−h1 to meet the second opening 143-343.

The y-axis in FIG. 4B will be a dimensionless ratio between the radius R(x) and $x_{max}$. As readily appreciated by the person skilled in the art, example embodiments of the apex discharge part may be provided in many different sizes, or scales, and it has been found that the shape described in FIG. 4B is beneficial for many sizes or scales of such apex discharge parts. R(x), x and $x_{max}$ is also defined in FIG. 4A for the first example embodiment of FIG. 5A. The solid line of FIG. 4B is a cubic spline interpolation of data points extracted along the inner surface 45 for varying distance from the first opening 41. The round circles on the solid line mark function values along the nonlinear function which function values are provided numerically in Table 1. It is envisaged that an inner surface which may be described by $R(x)/x_{max}$ of table 1 and FIG. 4B, or at least within a range +/−0.02 of the disclosed values of $R(x)/x_{max}$, is beneficial for providing good separation characteristics in the hydrocyclone separator.

TABLE 1

The radial distance R(x) between the common symmetry axis A and the inner surface of the apex discharge part divided by the distance $x_{max}$ starting at the first opening and extending towards the second opening, i.e. $R(x)/x_{max}$, for different distances x from the first opening along the common symmetry axis A normalized by $x_{max}$.

| $x/x_{max}$ | $R(x)/x_{max}$ |
|---|---|
| 0.00 | 0.625 |
| 0.05 | 0.620 |
| 0.10 | 0.615 |
| 0.15 | 0.610 |
| 0.20 | 0.603 |
| 0.25 | 0.596 |
| 0.30 | 0.588 |
| 0.35 | 0.579 |
| 0.40 | 0.569 |
| 0.45 | 0.558 |
| 0.50 | 0.546 |
| 0.55 | 0.532 |
| 0.60 | 0.517 |
| 0.65 | 0.499 |
| 0.70 | 0.480 |
| 0.75 | 0.457 |
| 0.80 | 0.430 |
| 0.81 | 0.424 |
| 0.82 | 0.418 |
| 0.83 | 0.411 |
| 0.84 | 0.404 |
| 0.85 | 0.397 |
| 0.86 | 0.390 |
| 0.87 | 0.382 |
| 0.88 | 0.374 |
| 0.89 | 0.366 |
| 0.90 | 0.356 |
| 0.91 | 0.347 |
| 0.92 | 0.336 |
| 0.93 | 0.325 |
| 0.94 | 0.312 |
| 0.95 | 0.299 |
| 0.96 | 0.283 |
| 0.97 | 0.265 |
| 0.98 | 0.244 |
| 0.99 | 0.216 |
| 1.00 | 0.163. |

As already mentioned, the function provided in FIG. 4B and Table 1 may be converted into absolute values for any chosen value of $x_{max}$. For the example embodiment of FIGS. 1, 2 and 5A, as well as the alternative example embodiments of 5B-5D, where $x_{max}$ is 400 mm, the curvature of Table 1 may be converted to obtain absolute dimensions. These are shown graphically in FIG. 4C and numerically in Table 2. The round circles in FIG. 4C correspond to absolute radial distance values R(x) along the common symmetry axis A according to the definitions of FIG. 4A. These absolute radial distance values R(x) are provided in Table 2. The dimensions defined by FIG. 4C and Table 2 are the same as the dimensions used for example embodiments of the hydrocyclone of the present disclosure that have been tested experimentally. Thus, all test results of the novel hydrocyclone of the present disclosure have been obtained by experimentally testing hydrocyclone separators having an apex discharge part with an inner surface being described by the function FIG. 4C and which intersects the function values listed in Table 2. As mentioned earlier, it should be noted that some example embodiments do not cover the entire length of the range defined by $x_{max}$, i.e. A−h1<$x_{max}$. For such example embodiments, the nonlinear function of FIG. 4C and Table 2 will still describe the shape of the inner surface for the x-values which are defined for that example embodiment, i.e. the x-values falling within the range of 0 to A−h1.

TABLE 2

The radial distance R(x) between the common symmetry axis A and the inner surface 45-345 of the apex discharge part 20, for varying distance x from the first opening 41-341 along the common symmetry axis A.

| X/mm | R(x)/mm |
|---|---|
| 0.00 | 250 |
| 20.0 | 248 |
| 40.0 | 246 |
| 60.0 | 244 |
| 80.0 | 241 |
| 100 | 238 |
| 120 | 235 |
| 140 | 232 |
| 160 | 228 |
| 180 | 223 |
| 200 | 218 |
| 220 | 213 |
| 240 | 207 |
| 260 | 200 |
| 280 | 192 |
| 300 | 183 |
| 320 | 172 |
| 324 | 170 |
| 328 | 167 |
| 332 | 164 |
| 336 | 162 |
| 340 | 159 |
| 344 | 156 |
| 348 | 153 |
| 352 | 150 |
| 356 | 146 |
| 360 | 143 |
| 364 | 139 |
| 368 | 134 |
| 372 | 130 |
| 376 | 125 |
| 380 | 119 |
| 384 | 113 |
| 388 | 106 |
| 392 | 97.5 |
| 396 | 86.5 |
| 400 | 65.0. |

Experimental Results

Several example embodiments of the hydrocyclone separator of to the present disclosure have been rigorously tested experimentally and selected results obtained from these experiments will later be described with reference to FIGS. 7 to 9.

The tests were conducted following the below described measurement methodology. Water was first added to a material supply tank. A target feed density was chosen for the test, and dry sample of a solid material was added to the material supply tank until the target feed density was reached. For all experiments, the solid material was an ore, more particularly Platinum Reef Ore from the Mogalakwena platinum mine plant in South Africa. The pump speed was then increased via VFD until a predetermined target pressure P for the test was reached. After steady state operation for about 15-20 minutes, samples of the input feed stream, the underflow stream as output through the apex discharge part 40, and the overflow discharge stream as output through the head part 10 was measured. As used herein, the term "course stream" is alternatively used to denote the underflow stream as output through the apex discharge part 40. Test data including the pump flow rate, the cyclone inlet pressure, the feed density, the pump power, the pump speed, and the temperature of the material stream was analyzed to make sure they did not vary more than 2%. Material densities were determined by using a graduated cylinder and a scale. The particle size distributions (PSDs) were determined from the sample flows by means of sieving analysis using sieve sizes ranging between 25 μm to 45,000 μm (23 size classes). Each test result was subsequently mass balanced.

Figure 6A:
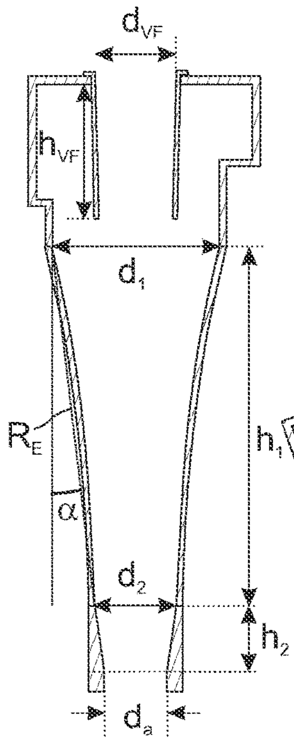
FIG. 6A is a schematic cross-sectional view of a conventional hydrocyclone separator of the prior art.
Figure 6B:
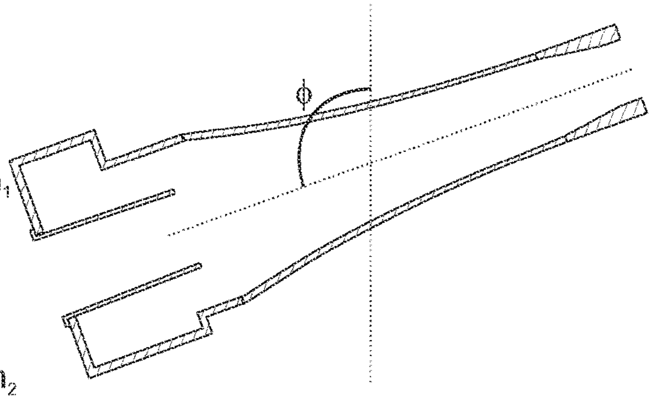
FIG. 6B is a schematic cross-sectional view of the conventional hydrocyclone separator of FIG. 6A when the conventional hydrocyclone separator is arranged in a tilted view.
Figure 6C:
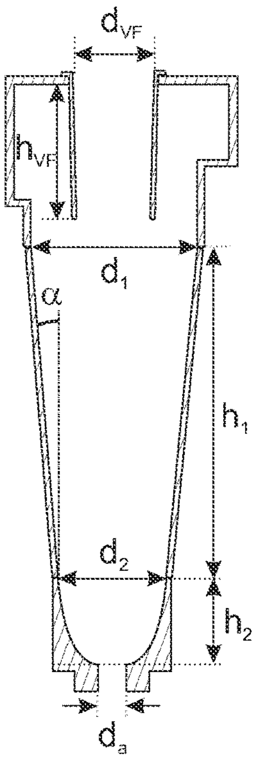
FIG. 6C is a schematic cross-sectional view of a hydrocyclone separator according to the disclosure.
Figure 7:
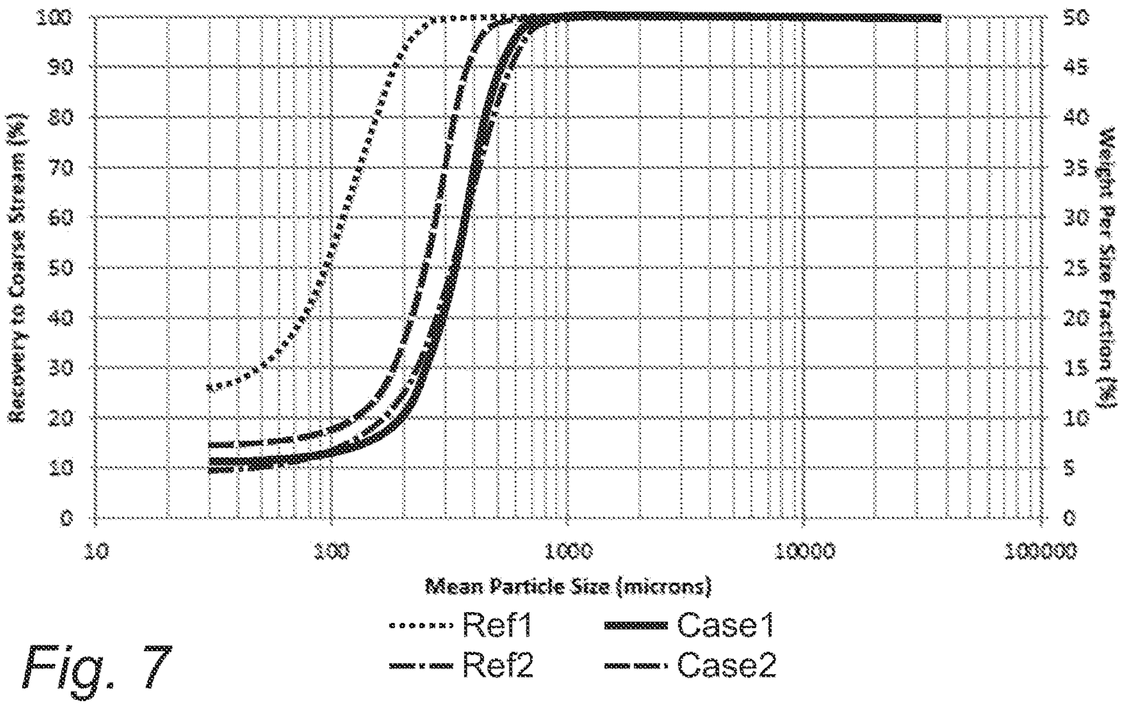
FIG. 7 shows experimentally obtained particle size distributions for different test objects described in FIGS. 6A-C and Table 3.

FIG. 6A to C and Table 3 together disclose the test cases on which the results in FIG. 7 are based. FIG. 6A schematically illustrates a conventional hydrocyclone separator design of the prior art, and this design was used in the experiments to form a base for reference cases to which the novel designs with the curved-surfaced apex part was compared. Two reference cases were tested with different tilt angle $\phi$: The first reference case, termed herein as "Ref1" was defined by running the hydrocyclone of FIG. 6A aligned vertically as illustrated in FIG. 6A (i.e. with a tilt angle $\phi$=0). The second reference case, termed herein as "Ref2" was defined by tilting another conventional hydrocyclone of the prior art to a tilt angle of $\phi$=110°. The difference between the hydrocyclones used for "Ref1" and "Ref2" is merely the apex output diameter $d_a$ (see Table 3). The overall design is the same and is illustrated in FIG. 6A. The tilted hydrocyclone used for "Ref2" is sometimes referred to as a "semi-inverted hydrocyclone". FIG. 6C schematically illustrate the novel hydrocyclone of the present disclosure. Different versions of this hydrocyclone were tested, the parameters being listed in Table 3. Altogether 4 of the tested cases are reported herein, referred to as "Case1" to "Case4", respectively. "Case1" and "Case2" differ from each other only in the dimensions of the tapered separation part 20, more particularly the height and cone angle thereof, see Table 3. It should be noted that the structural characteristics of "Case1" is similar to the earlier described example embodiment of the hydrocyclone separator 1 of this disclosure, the only difference being that instead of the abrasive-resistant body 42 of the first example embodiment having an apex output diameter, $d_a$=130 mm (see FIG. 5A), "Case1" and "Case2" were based on the use of the abrasive-resistant body 242 having an apex output diameter, $d_a$=190 mm.

TABLE 3

The test cases of FIG. 7

| | Name | | | |
|---|---|---|---|---|
| | Ref1 | Ref2 | Case1 | Case2 |
| | Shape | | | |
| | See FIG. 6A | See FIG. 6B | See FIG. 6C | See FIG. 6C |
| Tilt angle $\phi$ | 0° | 110° | 0° | 0° |
| % solids w/w | 55 | 60 | 55 | 55 |
| P (kPa) | 95 | 110 | 95 | 95 |
| $h_{VF}$ (mm) | 520 | 520 | 520 | 520 |
| $d_{VF}$ (mm) | 240 | 240 | 240 | 240 |
| $h_1$ (mm) | 1500 | 1500 | 1516 | 2016 |
| $h_2$ (mm) | 333 | 238 | 393 | 393 |
| $d_1$ (mm) | 675 | 675 | 675 | 675 |
| $d_2$ (mm) | 260 | 260 | 500 | 500 |
| Angle $\alpha$ *) | 8° | 8° | 3.3° | 2.5° |
| Apex angle $\beta_1$ | 84.4° | 84.4° | 85° | 85° |
| Apex angle $\beta_2$ | 84.4° | 84.4° | 20.1° | 20.1° |
| $d_a$ (mm) | 190 | 210 | 190 | 190 |

*) The angle $\alpha$ is the effective cone angle of the curvilinear inner wall of the tapered separation part at the wide opening end face for "Ref1" and "Ref2" (see FIG. 6A), and the cone angle for "Case1" and "Case2", see FIG. 6C). The effective cone angle $\alpha$ is defined by the angle formed between the common symmetry axis A and a reference line $R_E$ which is parallel with the radial reference plane $R_{xz}$ and which intersects the inner diameter $d_1$ of the wide opening end face 21 and the inner diameter $d_2$ of the narrow opening end face 23 (see FIG. 6A).

As can be seen in FIG. 7, the results obtained from the experiments conducted on the conventional hydrocyclone in the vertical arrangement, i.e. "Ref1", has the smallest cut size ($d_{50}$), –95 μm, among the tested cases. Also, the slope of the curve indicates that the separation efficiency is the lowest among the four cases and that a considerable fraction of the small-sized particles of the suspension ends up in the course stream (around 26% at 30 μm mean particle size). Needless to say, any small-sized particles ending up in the course stream are unwanted and one of the aims of improving a hydrocyclone separation process is to minimize the fraction of small-sized particles in the course stream. The "Ref1" results are typical for a conventional conical hydrocyclone, which are known to produce finer cuts. Turning to the results obtained from the experiments conducted on the other conventional hydrocyclone which was tilted to 110° relative to the vertical axis (i.e. relative to the arrangement used for "Ref1"), i.e. "Ref2", it can be clearly seen a significant increase in the particle cut size ($d_{50}$), –310 μm, i.e. about 3.3 times as large as for "Ref1". Moreover, the slope of the "Ref2"-curve is steeper, thus indicating a higher separation efficiency than for "Ref1". Finally, the fraction of small-sized particles that ends up in the course stream is considerably lowered (around 10% at 30 μm mean particle size for "Ref2"). So, the results show that running a conventional hydrocyclone in an inverted mode may be beneficial for obtaining increased cut size ($d_{50}$), an improved separation efficiency and a lowered fraction of small-sized particles in the course stream. These results are also expected from previous studies within the field.

Turning instead to the two test cases which are based on the hydrocyclone of the present disclosure, i.e. "Case1" and "Case2", it can be seen that the test case based on the longer tapered separation part, "Case2", shows a cut size ($d_{50}$) at about 230 μm, which is considerably larger than for the conventional hydrocyclone "Ref1" but at the same time somewhat smaller than for the semi-inverted conventional cyclone "Ref2". Importantly however, the separation efficiency of "Case 2" is clearly higher than the separation efficiency of "Ref1" as may be seen from the steeper gradient of the "Ref2"-curve. Also, the fraction of small-sized particles in the course stream is reduced (around 15% at 30 µm mean particle size). The test case based on the shorter tapered separation part, i.e. "Case1", interestingly shows about the same cut size ($d_{50}$) as the semi-inverted hydrocyclone case "Ref2" but with a considerably higher separation efficiency as evident by the steeper gradient of the curve. Also, the fraction of small-sized particles in the course stream is slightly lower than for "Case2" (around 12% at 30 µm mean particle size). FIG. 7 thus clearly shows that an example embodiment of the hydrocyclone separator of the present disclosure, "Case1", allows obtaining not only a more than three times larger cut size ($d_{50}$), but also a considerably higher separation efficiency and a considerably lower fraction of small-sized particles in the course stream than a conventional vertically arranged cyclone. More noteworthy, the hydrocyclone separator of the present disclosure also allows obtaining better size separation than a semi-inverted hydrocyclone as evidenced by the separation efficiency being higher for hydrocyclone separator "Case1" than for the semi-inverted hydrocyclone "Ref2" at about the same cut size ($d_{50}$) of −310 µm and fraction of small-sized particles in the course stream (10-12% at 30 µm mean particle size). FIG. 7 also clearly shows that the semi-inverted hydrocyclone "Ref2" is the only serious competitor to the hydrocyclone of the present disclosure "Case 1". As readily appreciated by the person skilled in the art, arranging hydrocyclones at 110° tilt angle is often difficult at plant sites due to size constraints. Moreover, semi-inverted hydrocyclones tend to be more difficult to operate since they are operated against gravity, thus requiring a higher start-up pressure which may cause unwanted vibrations. With the proposed hydrocyclone separator according to the present disclosure, it will thus be possible to provide vertically arranged hydrocyclones operating with separation characteristics at least as good as for the semi-inverted hydrocyclones of the prior art, or potentially even better as evidenced by the results presented in FIG. 7.

Figure 8:
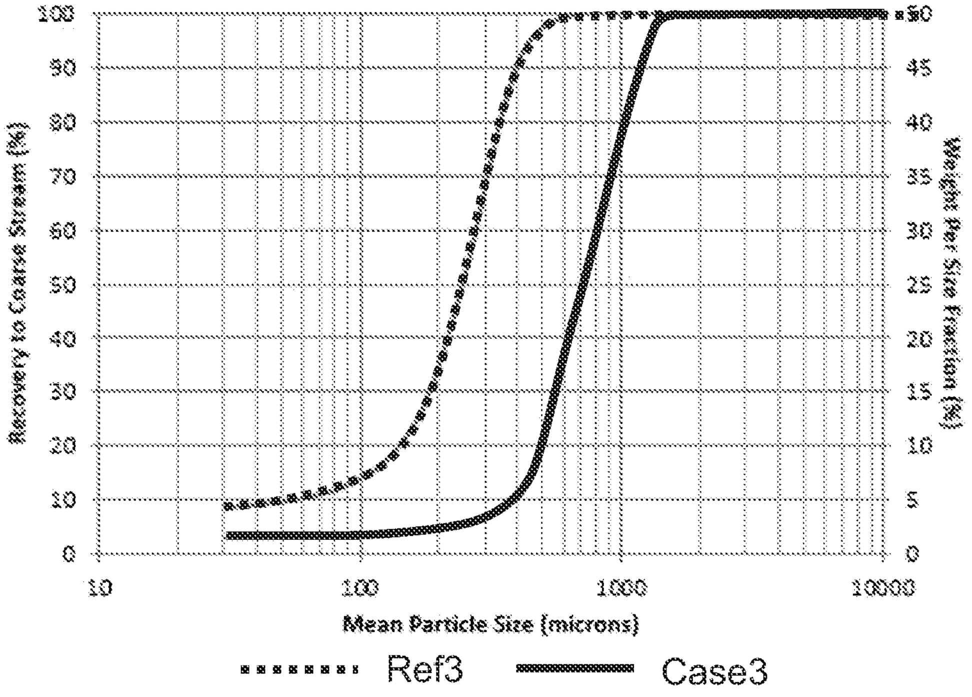
FIG. 8 shows experimentally obtained particle size distributions for different tested hydrocyclone separators described in FIGS. 6A and C and Table 4.
Figure 9:
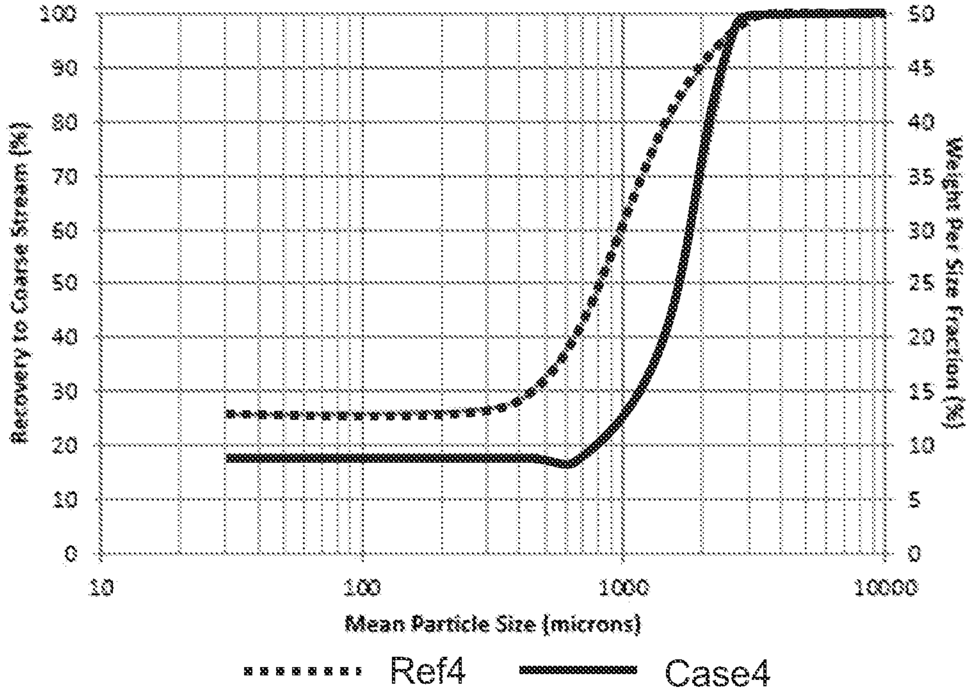
FIG. 9 shows experimentally obtained particle size distributions for different tested hydrocyclone separators described in FIGS. 6A and C and Table 4.

FIGS. 8 and 9 shows test results obtained in a second set of experiments for a conventional hydrocyclone and for a hydrocyclone according to another example embodiment for different operating conditions. The data for these test results are summarized in Table 4. As can be seen in Table 4, the conventional hydrocyclone used for "Ref3" and "Ref4" is similar to the ones used for "Ref1" and "Ref2", respectively, the only difference being the somewhat smaller apex output diameter $d_a$, which is 150 mm for the conventional hydrocyclone separator used for "Ref3" and "Ref4". The test series "Case3" and "Case4" were based on yet another example embodiment of the hydrocyclone separator of the present disclosure. This example embodiment differs from the previously described example embodiment on which "Case1" was based only in the somewhat smaller apex output diameter $d_a$, which is 150 mm for "Case3" and "Case4", whereas it was 190 mm for "Case1".

TABLE 4

The test cases of FIG. 8 and 9.

| | Name | | | |
|---|---|---|---|---|
| | Ref3 in FIG. 8 | Case 3 in FIG. 8 | Ref4 in FIG. 9 | Case4 in FIG. 9 |
| | Shape | | | |
| | See FIG. 6A | See FIG. 6C | See FIG. 6A | See FIG. 6C |
| Tilt angle φ | 0° | | 0° | 0° |
| % solids w/w | 55 | 55 | 65 | 65 |
| P (kPa) | 95 | 95 | 80 | 80 |
| $h_{VF}$ (mm) | 520 | 520 | 520 | 520 |
| $d_{VF}$ (mm) | 240 | 240 | 240 | 240 |
| $h_1$ (mm) | 1500 | 1516 | 1500 | 1516 |
| $h_2$ (mm) | 375 | 399 | 375 | 399 |
| $d_1$ (mm) | 675 | 675 | 675 | 675 |
| $d_2$ (mm) | 260 | 500 | 260 | 500 |
| Angle α *) | 8° | 3.3° | 8° | 3.3° |
| Apex angle $\beta_1$ | 82.1° | 85° | 82.1° | 85° |
| Apex angle $\beta_2$ | 82.1° | 9.4° | 82.1° | 9.4° |
| $d_a$ (mm) | 150 | 150 | 150 | 150 |

*) The angle α is the effective cone angle of the curvilinear inner wall of the tapered separation part at the wide opening end face for "Ref3" and "Ref4" (see FIG. 6A), and the cone angle for "Case3" and "Case4" (See FIG. 6C). The effective cone angle α is defined by the angle formed between the common symmetry axis A and a reference line $R_E$ which is parallel with the radial reference plane $R_{xz}$ and which intersects the inner diameter $d_1$ of the wide opening end face 21 and the inner diameter $d_2$ of the narrow opening end face 23 (see FIG. 6A).

The results shown in FIGS. 8 and 9 follows the general trends seen in FIG. 7 and will therefore only briefly be described herein.

With reference to FIG. 8, it can be seen that the cut size ($d_{50}$) is ~710 µm for "Case3", which is about 3.2 times larger than for the conventional hydrocyclone, "Ref3" at ~220 µm. The separation efficiency is also better for "Ref3" as evidenced by the steeper gradient in the curve of "Case3" than the curve of "Ref3". It is especially evident how the separation is steeper at the end points, i.e. when approaching the largest and the smallest mean particle sizes, respectively. Finally, the "Case3" has a considerably lower fraction of small-sized particles in the course stream (~4% for "Case3" vs. ~9% for "Ref3").

With reference to FIG. 9, it can be seen that the cut size ($d_{50}$) is ~1600 µm for "Case4", which is about 2 times larger than for the conventional hydrocyclone, "Ref4" at ~800 µm. The separation efficiency is considerably better for "Ref4" as evidenced by the considerably steeper gradient of the curve of "Case4" than of the curve of "Ref4". Finally, "Case4" has a considerably lower fraction of small-sized particles in the course stream than "Ref4" (~18% for "Case4" vs. ~27% for "Ref4").

Comparing the results presented in FIG. 8 with the results presented in FIG. 9 reveals overall better separation characteristics in FIG. 8, especially in terms of the fraction of small-sized particles in the course stream. Also, a considerable larger fraction of small-sized particles is reported to the underflow for the results presented in FIG. 9 than for the results presented in FIG. 8. Since the experiments are performed on the same pair of hydrocyclone geometries in the two cases, the reasons for the differences may be explained by the different operating conditions and material properties of the suspension input to the hydrocyclone separators. The experimental results shown in FIG. 8 was obtained from using a suspension with 55% solids w/w supplied to the hydrocyclone separators at an operating pressure of 95 kPa, whereas the experimental results shown in FIG. 9 was obtained from using a suspension with 65% solids w/w supplied to the hydrocyclone separator at an operating pressure of 80 kPa. By providing a larger fraction of solids in the suspension, and operating at lower pressure, the separation efficiency is expected to be lower. Generally, when establishing a suitable air core within a hydrocyclone separator, a certain operating feed pressure is required. If the operating pressure is too low, then the hydrocyclone separator may become unstable and the air core may collapse on itself. In theory, the lower the operating pressure the higher the chance of a collapsing air core. A collapsed air core would mean there is no separation occurring. Thus, by lowering the operating pressure, one may approach a condition of a barely stable air core, which in turn would lead to a less efficient separation. Regarding feed density, a plausible theory of the art suggests that slurry viscosity and density are interrelated properties and that an increase in the viscosity and density would result in a decrease in the sharpness of separation. One plausible explanation to this phenomenon is that the fines are significantly affected by the turbulent dispersion and the amount of flow resistance due to the high viscosity of the slurry, both of which may aggravate short circuiting to the underflow which would result in worse sharpness values. However, the important take away here is that, irrespective of if the separation process is more challenging as for Case4/Ref4, or a little less challenging as for Case3/Ref3, the tests indicate that the hydrocyclone separator of the present disclosure always outperforms the conventional hydrocyclone used as the reference for all three key parameters, namely the cut size ($d_{50}$), the separation efficiency and the fraction of small-sized particles in the course stream.

The results shown in FIGS. 7 to 9 are only a small selection from the total batch of experimental results obtained in the extensive experimental study made on the hydrocyclone separator of the present disclosure. Several operating pressures, solid content fractions and hydrocyclone dimensions within the ranges claimed herein were tested, and the results are conclusive. The tested hydrocyclone separator of the present disclosure was always found to outperform the conventional hydrocyclone separator used as a reference for that test when operated during similar test conditions.

The Properties of the Hydrocyclone

Figure 10:
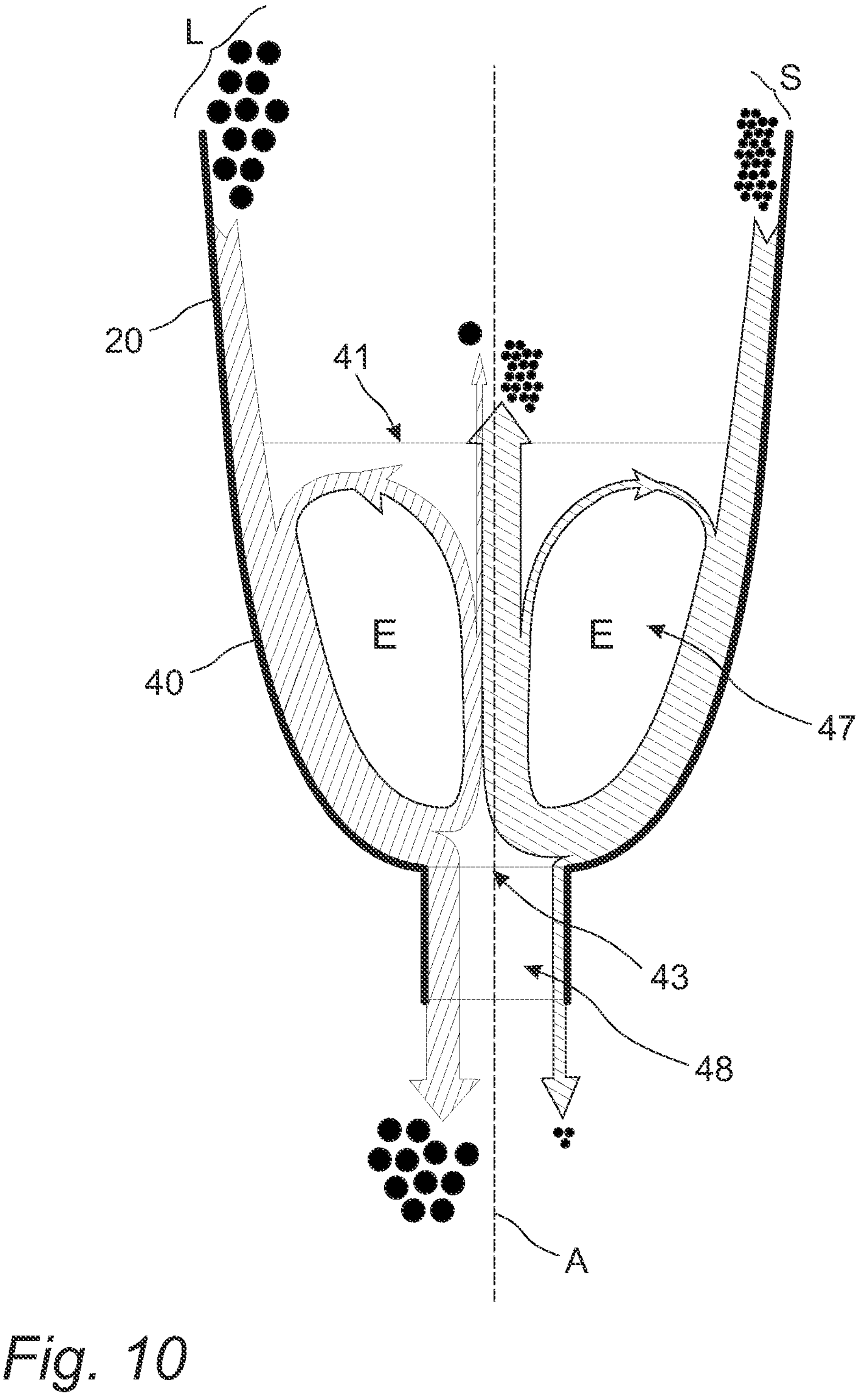
FIG. 10 is a schematic cross-sectional side view of parts of the tapered separation part and the apex discharge part of the example embodiment of FIGS. 1 and 2 in which is shown a relative abundance of large and small particles in different locations within the system.

The reason behind the improved separation efficiency in the hydrocyclone of the present disclosure is believed to be a trade-off between different physical phenomena of the flow. This will now be further described with reference to FIG. 10, which conceptually illustrates the relative abundance of large L and small S particles within the hydrocyclone separator 1 of the present disclosure using a Sankey diagram approach. Note that for clarity the left-hand side of FIG. 10 illustrates the relative abundance of large particles L only, and the right-hand side illustrates the relative abundance of small particles S only. In reality, of course both large L and small S particles will be present together within the hydrocyclone separator 1.

At portions of the apex discharge part 40 closer to the first opening 41, i.e. where the tangential angle β is relatively large, such as e.g. >80°, the axial and tangential velocities are generally high. The reason for the higher axial velocity is due to outer vortex flows downward motion being enhanced as there is a relatively unhindered flow path to the underflow and discharge. Smaller particles S which enter the hydrocyclone close to the wall under influence of the higher tangential and axial velocities tend to be trapped by the coarse particles and to follow the coarse particles in the direction towards the apex discharge part 40. At portions closer to the second opening 43, i.e. where the tangential angle β is relatively small, such as e.g. <50°, the axial velocity will decrease since the progressively decreasing cross-sectional profile as seen transverse to the common symmetry axis A effectively acts as a hinderance to the underflow and discharge through the second opening 43. This lower axial velocity aids in increasing retention time allowing smaller particles to migrate under drag to the inner up flowing vortex core.

At the same time, tangential velocities in these portions closer to the second opening 43 are not decreasing to the same extent. Similar to what has been found for flatbottom cyclones, the portions of the first sub volume 47 being closer to the second opening 43 will ensure that larger particles L are subjected to the up flowing internal vortical core at the common symmetry axis A. This effectively allows a second classification of these particles, while also present smaller particles get sucked up to the overflow. However, contrary to conventional flat-bottom designs, a difference is that larger particles, which are also sucked up, is now subjected to the larger tangential velocities, relative to the flatbottom cyclones, which is maintained due to the rounded shape of the inner surface 45 of the apex discharge part 40. This results in the larger particles L once again being centrifuged towards the outside wall 45 and translating in a higher probability that they finally will report to the underflow. In other words, the convex shape creates a very effective secondary elutriation classification zone E at the bottom, which effectively will increase the sharpness of the classification. In other words, the rounded shape of the first internal sub-volume 47, which may be disclosed as a bowl shape or a concave shape, thus forces the flow to change direction, but gently more than abruptly, and thereby affects the tangential velocities and may as a result thereof aid in supporting the formation of vortices within the apex discharge part 40 without disturbing the flow of the largest particles L towards the underflow, thus avoiding deposit formation. The vortices, or eddies, support the formation of the aforementioned secondary elutriation classification zone E at the bottom. Needless to say, some particles may be transported more than one extra turn through said secondary elutriation classification zone E. Taken together, the likelihood that a particle having a size larger than but close to the cut size ($d_{50}$) will report to the underflow is even further increased.

The particle cut size ($d_{50}$) for the hydrocyclone separator of the present disclosure has been found to be significantly larger than for a conventional conical design. This may also be explained by the flow pattern described hereinabove. Similar to the conventional flat-bottom designs, the lower axial velocity may greatly aid in increasing retention time allowing larger particles to build up at the bottom, and thereby report to the underflow. When exposed to the axial upflow in the centre a larger portion of coarser particles, than would be the case in a traditional conical cyclone, will therefore report to the overflow. This will cause the particle cut size ($d_{50}$), which has an equal probability to report to the over- or underflow, to become coarser than in a traditional conical cyclone.

The skilled person realises that a number of modifications of the embodiments described herein are possible without departing from the scope of the present disclosure, which is defined in the appended claims.

LIST OF EMBODIMENTS

1. A hydrocyclone separator for size classifying solid material in liquid suspension, comprising
   - a head part having an inlet conduit configured to lead a suspension into the head part, and having an overflow discharge tube arranged axially in the head part, a tapered separation part, and an apex discharge part for underflow discharge, the tapered separation part being arranged between the head part and the apex discharge part with a wide opening end face aligned and arranged to the head part and a narrower opening end face aligned and arranged to the apex discharge part, wherein the apex discharge part has a first opening aligned and attached with the narrower opening end face of the tapered separation part, and has a second opening for underflow discharge in a surface opposite to the first opening, the first opening being larger than the second opening, and an inner surface of the apex discharge part has a curvature extending from the first opening to the second opening, wherein the tapered separation part and the apex discharge part has a common symmetry axis, and wherein the apex discharge part at the second opening ends in a curvature in a tangential angle, $\beta$, within the range of $0° < \beta < 40°$ from a reference plane defined transverse to the common symmetry axis.

2. The hydrocyclone separator according to embodiment 1, wherein the apex discharge part at the second opening ends in a curvature in the tangential angle, $\beta$, within the range of $0° < \beta < 30°$ from the reference plane, $1° < \beta < 30°$ from the reference plane, $2° < \beta < 26°$ from the reference plane, $3° < \beta < 20°$ from the reference plane, or $4° < \beta < 20°$ from the reference plane.

3. The hydrocyclone separator according to embodiment 1 or 2, wherein the tapered separation part has a tangential angle, $\alpha$, within the range of $0° < \alpha < 20°$, $0° < \alpha < 150$, $0° < \alpha < 120$, $0° < \alpha < 100$, $2.5° < \alpha < 100$, $2.50 < \alpha < 7.50$, or $3.50 < \alpha < 6.50$ with respect to the common symmetry axis.

4. The hydrocyclone separator according to embodiment 1 or 2, wherein the tapered separation part comprises a frusto-conical separation part having one cone angle $\alpha$, within the range of $0° < \alpha < 20°$, $0° < \alpha < 15°$, $0° < \alpha < 12°$, $0° < \alpha < 10°$, $2.5° < \alpha < 10°$, $2.5° < \alpha < 7.5°$, or $3.5° < \alpha < 6.5°$ with respect to the common symmetry axis.

5. The hydrocyclone separator according to any one of embodiment 1 to 4, wherein a distance (F−h) between the wide opening end face and the narrower opening end face of the tapered separation part, in relation with a distance (A−h1) between the first opening and the second opening of the apex discharge part, (F−h):(A−h1), is larger than 2.4, within the range of 2.4 to 4.5, or within the range of 3 to 4.

6. The hydrocyclone separator according to any one of embodiment 1 to 5, wherein a distance (F−h) between the wide opening end face and the narrower opening end face of the tapered separation part, in relation with a diameter (F−d1) of the wide opening end face of the tapered separation part, (F−h):(F−d1), is within the range of 1.5 to 5.

7. The hydrocyclone separator according to any one of embodiment 1 to 6, wherein a distance (A−h1) between the first opening and the second opening of the apex discharge part, in relation with a diameter (A−d1) of the first opening for the apex discharge part, (A−h1):(A−d1), is within the range of 0.5 to 1, or within the range of 0.7 to 0.9.

8. The hydrocyclone separator according to any one of embodiment 1 to 7, wherein a diameter (A−d1) of the first opening of the apex discharge part in relation with a diameter (A−d2) of the second opening for the apex discharge part, (A−d1):(A−d2), is within the range of 2 to 5, or within the range of 2 to 4, or within the range of 2.5 to 3.5.

9. The hydrocyclone separator according to any one of embodiment 1 to 8, wherein the apex discharge part at the first opening starts in a curvature in a tangential angle, $\beta$, within the range of $70° < \beta < 90°$ with respect to the reference plane.

10. The hydrocyclone separator according to any one of embodiment 1 to 9, wherein the apex discharge part at the first opening starts in a curvature in a tangential angle, $\beta$, being equal to, or substantially equal to $90° - \alpha$, where $\alpha$ is a cone angle of the tapered separation part, as defined with respect to the common symmetry axis.

11. The hydrocyclone separator according to any one of embodiment 1 to 10, wherein the curvature of the inner surface of the apex discharge part is gradually increasing along the common symmetry axis from the first opening to the second opening.

12. The hydrocyclone separator according to any one of embodiment 1 to 11, wherein a ratio between an inside radius R(x) of the inner surface of the apex discharge part as defined from a common symmetry axis A of the apex discharge part and a distance $x_{max}$ starting at the first opening and extending towards the second opening, $R(x)/x_{max}$, is described by a non-linear function which falls within the following ranges for varying relative distance $x/x_{max}$ from the first opening to the second opening along the common symmetry axis:

| $x/x_{max}$ | $R(x)/x_{max}$ |
|---|---|
| 0.000000 | 0.625000 +/− 0.02 |
| 0.050000 | 0.620419 +/− 0.02 |
| 0.100000 | 0.615341 +/− 0.02 |
| 0.150000 | 0.609660 +/− 0.02 |
| 0.200000 | 0.603270 +/− 0.02 |
| 0.250000 | 0.596067 +/− 0.02 |
| 0.300000 | 0.587972 +/− 0.02 |
| 0.350000 | 0.579073 +/− 0.02 |
| 0.400000 | 0.569334 +/− 0.02 |
| 0.450000 | 0.558396 +/− 0.02 |
| 0.500000 | 0.546047 +/− 0.02 |
| 0.550000 | 0.532202 +/− 0.02 |
| 0.600000 | 0.516762 +/− 0.02 |
| 0.650000 | 0.499447 +/− 0.02 |
| 0.700000 | 0.479712 +/− 0.02 |
| 0.750000 | 0.456803 +/− 0.02 |
| 0.800000 | 0.429828 +/− 0.02 |
| 0.810000 | 0.423859 +/− 0.02 |
| 0.820000 | 0.417667 +/− 0.02 |
| 0.830000 | 0.411224 +/− 0.02 |
| 0.840000 | 0.404498 +/− 0.02 |
| 0.850000 | 0.397460 +/− 0.02 |
| 0.860000 | 0.390081 +/− 0.02 |
| 0.870000 | 0.382330 +/− 0.02 |
| 0.880000 | 0.374163 +/− 0.02 |
| 0.890000 | 0.365522 +/− 0.02 |
| 0.900000 | 0.356343 +/− 0.02 |
| 0.910000 | 0.346533 +/− 0.02 |
| 0.920000 | 0.335982 +/− 0.02 |
| 0.930000 | 0.324567 +/− 0.02 |
| 0.940000 | 0.312151 +/− 0.02 |
| 0.950000 | 0.298507 +/− 0.02 |
| 0.960000 | 0.283146 +/− 0.02 |
| 0.970000 | 0.265319 +/− 0.02 |
| 0.980000 | 0.243758 +/− 0.02 |
| 0.990000 | 0.216214 +/− 0.02 |
| 1.000000 | 0.162500 +/− 0.02 |

13. The hydrocyclone separator according to embodiment 12, wherein the distance $x_{max}$ falls within the range of 40 to 1000 mm, or 200 to 500 mm, or 300 to 450 mm, or 350 to 430 mm, or being about 400 mm.

The invention claimed is:

1. A hydrocyclone separator for size classifying solid material in liquid suspension, comprising:

a head part having an inlet conduit configured to lead a suspension including the solid material into the head part, and having an overflow discharge tube arranged axially in the head part, a tapered separation part, and an apex discharge part for underflow discharge, the tapered separation part being arranged between the head part and the apex discharge part with a wide opening end face aligned and arranged to the head part and a narrower opening end face aligned and arranged to the apex discharge part, wherein the apex discharge part has a first opening aligned and attached with the narrower opening end face of the tapered separation part, and has a second opening for underflow discharge in a surface opposite to the first opening, the first opening being larger than the second opening, and an inner surface of the apex discharge part has a curvature extending from the first opening to the second opening, wherein the tapered separation part and the apex discharge part has a common symmetry axis, and wherein the apex discharge part at the second opening ends in a curvature in a tangential angle, β, within the range of 0°<β<40° from a reference plane defined transverse to the common symmetry axis, wherein the inner surface of the apex discharge part has a curvature shaped such that a ratio between an inside radius R(x) of the inner surface of the apex discharge part as defined from a common symmetry axis A of the apex discharge part and a distance $x_{max}$ starting at the first opening and extending towards the second opening, $R(x)/x_{max}$, falls within the following ranges for varying relative distance $x/x_{max}$ from the first opening to the second opening along the common symmetry axis:

| $x/x_{max}$ | $R(x)/x_{max}$ |
|---|---|
| 0.000000 | 0.625000 +/− 0.02 |
| 0.050000 | 0.620419 +/− 0.02 |
| 0.100000 | 0.615341 +/− 0.02 |
| 0.150000 | 0.609660 +/− 0.02 |
| 0.200000 | 0.603270 +/− 0.02 |
| 0.250000 | 0.596067 +/− 0.02 |
| 0.300000 | 0.587972 +/− 0.02 |
| 0.350000 | 0.579073 +/− 0.02 |
| 0.400000 | 0.569334 +/− 0.02 |
| 0.450000 | 0.558396 +/− 0.02 |
| 0.500000 | 0.546047 +/− 0.02 |
| 0.550000 | 0.532202 +/− 0.02 |
| 0.600000 | 0.516762 +/− 0.02 |
| 0.650000 | 0.499447 +/− 0.02 |
| 0.700000 | 0.479712 +/− 0.02 |
| 0.750000 | 0.456803 +/− 0.02 |
| 0.800000 | 0.429828 +/− 0.02 |
| 0.810000 | 0.423859 +/− 0.02 |
| 0.820000 | 0.417667 +/− 0.02 |
| 0.830000 | 0.411224 +/− 0.02 |
| 0.840000 | 0.404498 +/− 0.02 |
| 0.850000 | 0.397460 +/− 0.02 |
| 0.860000 | 0.390081 +/− 0.02 |
| 0.870000 | 0.382330 +/− 0.02 |
| 0.880000 | 0.374163 +/− 0.02 |
| 0.890000 | 0.365522 +/− 0.02 |
| 0.900000 | 0.356343 +/− 0.02 |
| 0.910000 | 0.346533 +/− 0.02 |
| 0.920000 | 0.335982 +/− 0.02 |
| 0.930000 | 0.324567 +/− 0.02 |
| 0.940000 | 0.312151 +/− 0.02 |
| 0.950000 | 0.298507 +/− 0.02 |
| 0.960000 | 0.283146 +/− 0.02 |
| 0.970000 | 0.265319 +/− 0.02 |
| 0.980000 | 0.243758 +/− 0.02 |
| 0.990000 | 0.216214 +/− 0.02 |
| 1.000000 | 0.162500 +/− 0.02. |

2. The hydrocyclone separator according to claim 1, wherein the apex discharge part at the second opening ends in a curvature in the tangential angle, β, within the range of 0°<β<30° from the reference plane, 1°<β<30° from the reference plane, 2°<β<26° from the reference plane, 3°<β<20° from the reference plane, or 4°<β<20° from the reference plane.

3. The hydrocyclone separator according to claim 1, wherein the tapered separation part has a tangential angle, α, within the range of 0°<α<20°, 0°<α<15°, 0°<α<12°, 0°<α<10°, 2.5°<α<10°, 2.5°<α<7.5°, or 3.5°<α<6.5° with respect to the common symmetry axis.

4. The hydrocyclone separator according to claim 1, wherein the tapered separation part comprises a frustoconical separation part having one cone angle α, within the range of 0°<α<20°, 0°<α<15°, 0°<α<12°, 0°<α<10°, 2.5°<α<10°, 2.5°<α<7.5°, or 3.5°<α<6.5° with respect to the common symmetry axis.

5. The hydrocyclone separator according to claim 1, wherein a distance (F−h) between the wide opening end face and the narrower opening end face of the tapered separation part, in relation with a distance (A−h1) between the first opening and the second opening of the apex discharge part, (F−h):(A−h1), is larger than 2.4, within the range of 2.4 to 4.5, or within the range of 3 to 4.

6. The hydrocyclone separator according to claim 1, wherein a distance (F−h) between the wide opening end face and the narrower opening end face of the tapered separation part, in relation with a diameter (F−d1) of the wide opening end face of the tapered separation part, (F−h):(F−d1), is within the range of 1.5 to 5.

7. The hydrocyclone separator according to claim 1, wherein a distance (A−h1) between the first opening and the second opening of the apex discharge part, in relation with a diameter (A−d1) of the first opening for the apex discharge part, (A−h1):(A−d1), is within the range of 0.5 to 1, or within the range of 0.7 to 0.9.

8. The hydrocyclone separator according to claim 1, wherein a diameter (A−d1) of the first opening of the apex discharge part in relation with a diameter (A−d2) of the second opening for the apex discharge part, (A−d1):(A−d2), is within the range of 2 to 5, or within the range of 2 to 4, or within the range of 2.5 to 3.5.

9. The hydrocyclone separator according to claim 1, wherein the apex discharge part at the first opening starts in a curvature in a tangential angle, β, within the range of 70°<β<90° with respect to the reference plane.

10. The hydrocyclone separator according to claim 1, wherein the apex discharge part at the first opening starts in a curvature in a tangential angle, β, being equal to, or substantially equal to 90°−α, where α is a cone angle of the tapered separation part, as defined with respect to the common symmetry axis.

11. The hydrocyclone separator according to claim 1, wherein the curvature of the inner surface of the apex discharge part is gradually increasing along the common symmetry axis from the first opening to the second opening.

12. The hydrocyclone separator according to claim 1, wherein the distance $x_{max}$ falls within the range of 30 to 1000 mm, 200 to 500 mm, or 300 to 450 mm, or 350 to 430 mm, or being about 400 mm.

* * * * *